US010588162B2

(12) United States Patent
Ji et al.

(10) Patent No.: US 10,588,162 B2
(45) Date of Patent: Mar. 10, 2020

(54) LTE-U UPLINK WAVEFORM AND VARIABLE MULTI-SUBFRAME SCHEDULING

(71) Applicant: QUALCOMM Incorporated, San Diego, CA (US)

(72) Inventors: Tingfang Ji, San Diego, CA (US); Tao Luo, San Diego, CA (US); Naga Bhushan, San Diego, CA (US); Durga Prasad Malladi, San Diego, CA (US); Yongbin Wei, La Jolla, CA (US); Peter Gaal, San Diego, CA (US); Aleksandar Damnjanovic, Del Mar, CA (US); Wanshi Chen, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/682,219

(22) Filed: Aug. 21, 2017

(65) Prior Publication Data

US 2017/0347382 A1 Nov. 30, 2017

Related U.S. Application Data

(62) Division of application No. 14/493,067, filed on Sep. 22, 2014, now Pat. No. 9,743,432.

(Continued)

(51) Int. Cl.
*H04W 4/00* (2018.01)
*H04W 74/08* (2009.01)
(Continued)

(52) U.S. Cl.
CPC ........... *H04W 74/0866* (2013.01); *H04J 3/16* (2013.01); *H04J 13/10* (2013.01); *H04L 5/0041* (2013.01);
(Continued)

(58) Field of Classification Search
None
See application file for complete search history.

(56) References Cited

U.S. PATENT DOCUMENTS

| 7,974,299 B1 | 7/2011 | Banerjea et al. |
| 9,319,195 B2 | 4/2016 | Cheng et al. |

(Continued)

FOREIGN PATENT DOCUMENTS

| EP | 2075945 A2 | 7/2009 |
| EP | 2180732 A1 | 4/2010 |

(Continued)

OTHER PUBLICATIONS

3GPP: "3rd Generation Partnership Project; Remaining Issues on SRS Configuration," TSG RAN WG1 meeting #70, 3GPP, R1-123352, Qingdao, China, Aug. 2012, 5 pages.

(Continued)

*Primary Examiner* — Bob A Phunkulh
(74) *Attorney, Agent, or Firm* — Harrity & Harrity, LLP

(57) ABSTRACT

Uplink waveforms for operating long term evolution (LTE) in an unlicensed band (i.e., long term evolution-unlicensed (LTE-U) communication) are disclosed. Carrier aggregation (CA) and standalone (SA) are disclosed. LTE on the licensed channel may provide both control and data, LTE on the unlicensed channel may provide data. Managing variable transmission time interval (TTI) continuous transmission is disclosed for transmission over multiple subframes of an unlicensed carrier in LTE-U. Listen-before-talk (LBT) requirements of unlicensed carriers provide for additional channel occupancy constraints when scheduling resources for multiple UEs for variable TTI continuous uplink transmissions over multiple subframes. A joint control channel is disclosed that provides control information for all of the potentially available subframes to be scheduled for the uplink transmissions. In addition to management of the (Continued)

variable TTI continuous transmissions, adjustments to uplink signal parameters are also disclosed that address the constraints due to the LBT requirements of unlicensed carriers.

48 Claims, 32 Drawing Sheets

Related U.S. Application Data

(60) Provisional application No. 61/881,299, filed on Sep. 23, 2013, provisional application No. 61/881,381, filed on Sep. 23, 2013.

(51) Int. Cl.
*H04L 5/00* (2006.01)
*H04J 3/16* (2006.01)
*H04J 13/10* (2011.01)
*H04W 16/14* (2009.01)
*H04W 72/04* (2009.01)
*H04W 74/00* (2009.01)

(52) U.S. Cl.
CPC .......... *H04L 5/0048* (2013.01); *H04L 5/0053* (2013.01); *H04L 5/0094* (2013.01); *H04W 16/14* (2013.01); *H04W 72/0453* (2013.01); *H04W 74/002* (2013.01)

(56) References Cited

U.S. PATENT DOCUMENTS

| | | | |
|---|---|---|---|
| 9,717,098 B2 | 7/2017 | Bhushan et al. | |
| 9,787,443 B2 | 10/2017 | Damnjanovic et al. | |
| 9,854,446 B2 | 12/2017 | Kim et al. | |
| 2002/0160769 A1 | 10/2002 | Gray | |
| 2006/0227801 A1 | 10/2006 | Nanda et al. | |
| 2006/0274863 A1 | 12/2006 | Haentzschel et al. | |
| 2008/0049690 A1* | 2/2008 | Kuchibhotla | H04W 72/0406 370/338 |
| 2008/0305744 A1 | 12/2008 | Furuskar et al. | |
| 2010/0023830 A1* | 1/2010 | Wengerter | H04L 1/0025 714/748 |
| 2010/0195586 A1 | 8/2010 | Choi et al. | |
| 2010/0246721 A1* | 9/2010 | Chen | H04L 1/0038 375/316 |
| 2010/0312894 A1 | 12/2010 | Awad et al. | |
| 2011/0090863 A1 | 4/2011 | Hao et al. | |
| 2011/0274092 A1 | 11/2011 | Liu et al. | |
| 2012/0033643 A1 | 2/2012 | Noh et al. | |
| 2012/0039284 A1 | 2/2012 | Barbieri et al. | |
| 2012/0063412 A1 | 3/2012 | Kiyoshima et al. | |
| 2012/0250532 A1 | 10/2012 | Husted et al. | |
| 2013/0003663 A1 | 1/2013 | Blankenship et al. | |
| 2013/0017794 A1 | 1/2013 | Kloper et al. | |
| 2013/0100901 A1 | 4/2013 | Shan et al. | |
| 2013/0107822 A1* | 5/2013 | Papasakellariou | H04W 72/04 370/329 |
| 2013/0142291 A1 | 6/2013 | Dinan | |
| 2013/0163530 A1 | 6/2013 | Chen et al. | |
| 2013/0194944 A1 | 8/2013 | Soyak et al. | |
| 2013/0202015 A1 | 8/2013 | Frank et al. | |
| 2013/0235826 A1 | 9/2013 | Nakao et al. | |
| 2013/0308506 A1 | 11/2013 | Kim et al. | |
| 2013/0315113 A1* | 11/2013 | Seo | H04L 5/001 370/280 |
| 2013/0322277 A1 | 12/2013 | Vanganuru et al. | |
| 2014/0003262 A1 | 1/2014 | He et al. | |
| 2014/0133425 A1* | 5/2014 | Kim | H04B 7/024 370/329 |
| 2014/0146768 A1 | 5/2014 | Seo et al. | |
| 2014/0185495 A1 | 7/2014 | Kuchibhotla et al. | |
| 2014/0187283 A1 | 7/2014 | Nimbalker et al. | |
| 2014/0254538 A1 | 9/2014 | Park et al. | |
| 2014/0307693 A1 | 10/2014 | Feng et al. | |
| 2015/0009845 A1 | 1/2015 | Takano | |
| 2015/0085797 A1 | 3/2015 | Ji et al. | |
| 2015/0208296 A1 | 7/2015 | Song et al. | |
| 2015/0208387 A1 | 7/2015 | Awad et al. | |
| 2015/0223241 A1 | 8/2015 | Cattoni et al. | |
| 2016/0081084 A1 | 3/2016 | Blankenship et al. | |

FOREIGN PATENT DOCUMENTS

| | | |
|---|---|---|
| JP | 2011525086 A | 9/2011 |
| KR | 20090050913 A | 5/2009 |
| WO | 2009154415 A2 | 12/2009 |
| WO | 2013006006 A2 | 1/2013 |
| WO | 2013049768 A1 | 4/2013 |
| WO | 2013112983 A2 | 8/2013 |
| WO | 2013116534 A1 | 8/2013 |
| WO | 2014189915 A2 | 11/2014 |
| WO | 2015184216 A1 | 12/2015 |

OTHER PUBLICATIONS

International Search Report and Written Opinion—PCT/US2014/057028—ISA/EPO—dated Mar. 30, 2015.
Partial International Search Report—PCT/US2014/057028—ISA/EPO—dated Dec. 17, 2014.
"ETSI EN 301 893 v1.4.1; Broadband Radio Access Networks (BRAN); 5 GHz High Performance RLAN; Harmonized EN Covering Essential Requirements of Article 3.2 of the R&TTE Directive", Jul. 2007, 60 pages.
3GPP TS 36.211: "3rd Generation Partnership Project; Technical Specification Group Radio Access Network; Evolved Universal Terrestrial Radio Access (E-UTRA); Physical Channels and Modulation (Release 11)," V11.3.0, Jun. 2013, pp. 1-108.
"3rd Generation Partnership Project; Technical Specification Group Radio Access Network; Evolved Universal Terrestrial Radio Access (E-UTRA); User Equipment (UE) Radio Transmission and Reception (Release 12)", 3GPP TS 36.101, V12.0.0, Jul. 7, 2013, pp. 1-450.
Texas Instruments: "Increasing Sounding Capacity for LTE-A," 3GPP Draft; R1-100745 TI Increasing Sounding Capacity for LTE-A_R4, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; Jan. 18, 2010, Jan. 21, 2010 (Jan. 21, 2010), XP050418383, [retrieved on Jan. 21, 2010].

\* cited by examiner

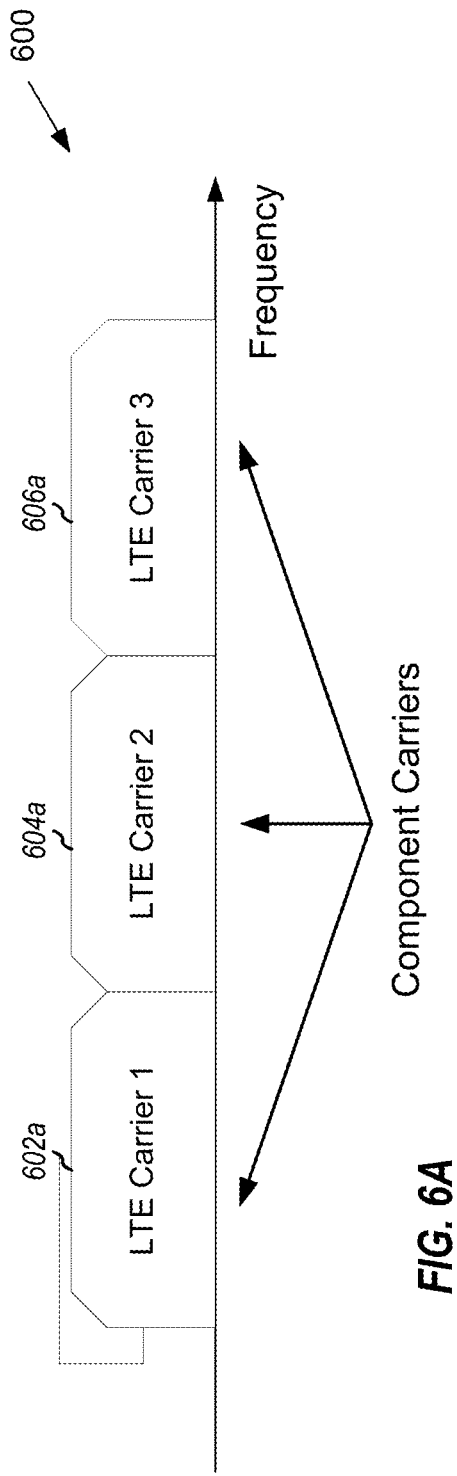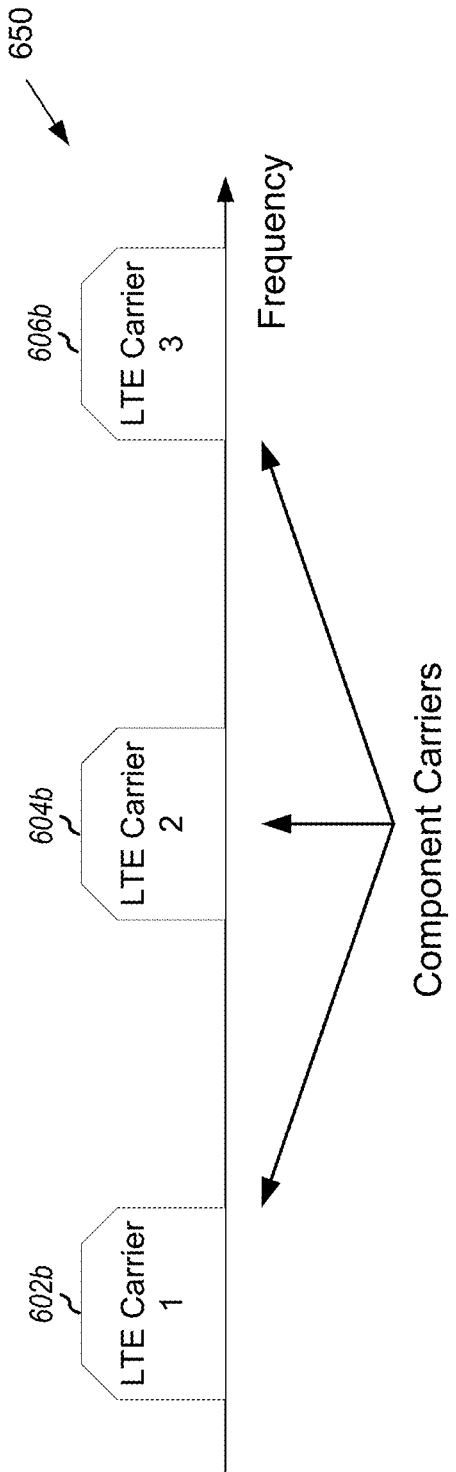

FIG. 15

| UE Waveform Options: Minimum change — Narrow band waveform with mirror hopping; multi-cluster | | | | | |
|---|---|---|---|---|---|
| | | | SC-FDMA | MC SC-FDMA | Interleaved FDMA |
| CDM | | | | | |
| OFF | TDM | N Ts | | | |
| | | 1+1 slot | Hopping for: PUCCH, PUSCH, Candidate for PRACH/SRS | | |
| | | 1ms | PUSCH WB | Interleaved FDMA at RB level | |
| ON | | N Ts | | | |
| | | 1+1 slot | | | |
| | | 1ms | | | |

UE Waveform Options: TDM + FDM
- Straightforward, channelize over 20MHz x N symbols; could use clusters for NB channels like PUCCH/SRS/PRACH
- Not possible to be used with CCA of variable TTI

| CDM | TDM | SC-FDMA | MC SC-FDMA | Interleaved FDMA |
|---|---|---|---|---|
| OFF | N Ts | 20 MHz: multiplex up to 14 Ues Link budget loss due to TDM | Clusters for PUCCH/SRS/PRACH | |
| | 1+1 slot | | | |
| | 1ms | | | |
| ON | N Ts | | | |
| | 1+1 slot | | | |
| | 1ms | | | |

*FIG. 16*

TDM CCA details

- Alternative to variable TTI and FDM between UEs
- UEs from the same group perform CCA at the same location
- If a UE discontinue the transmission, it should perform CCA before new transmission
  - Channels are structured to have CCA opportunities between transmission bursts
  - Minimum is 1 OFDM symbol
  - Likely 1 CCA is needed since no reuse is needed

UE Waveform Options: FDM
- Channelize over tones: different granularities could be achieved
- Tough time/freq requirements: bigger change

| | | | SC-FDMA | MC | Interleaved |
|---|---|---|---|---|---|
| | | | | SC-FDMA | FDMA |
| CDM | | TDM | | | |
| OFF | | N Ts | | | |
| | | 1+1 slot | | | I-FDMA. Tone interleaving: Study sensitive to timing/freq error. |
| | | 1ms | | | |
| ON | | N Ts | | | |
| | | 1+1 slot | | | |
| | | 1ms | | | |

*FIG. 18*

UE Waveform Options: CDM
- CDM waveforms tolerate more collisions. Decoding complexity and power control sensitivity could be a drawback

| CDM | TDM | SC-FDMA | MC | Interleaved |
| --- | --- | --- | --- | --- |
|  |  |  | SC-FDMA | FDMA |
| OFF | N Ts |  |  |  |
|  | 1+1 slot |  |  |  |
|  | 1ms |  |  |  |
| ON | N Ts |  |  |  |
|  | 1+1 slot |  |  |  |
|  | 1ms | CDMA for all UL channels |  |  |

*FIG. 19*

LTE-U UPLINK WAVEFORM AND VARIABLE MULTI-SUBFRAME SCHEDULING

CROSS-REFERENCE TO RELATED APPLICATIONS

This application is a divisional of U.S. patent application Ser. No. 14/493,067, which was filed Sep. 22, 2014 (now U.S. Pat. No. 9,743,432), which claims the benefit of U.S. Provisional Patent Application No. 61/881,381, entitled "LTE-U UPLINK WAVEFORM", which was filed Sep. 23, 2013, and U.S. Provisional Patent Application No. 61/881,299, entitled "VARIABLE MULTI-SUBFRAME SCHEDULING", which was filed Sep. 23, 2013. The entirety of the aforementioned applications is hereby incorporated by reference.

FIELD

Aspects of the present disclosure relate generally to wireless communication systems, and more particularly, to methods for transmission using long term evolution-unlicensed (LTE-U) uplink waveforms and variable multi-subframe scheduling in LTE-U communication systems.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of access points, base stations or node Bs that can support communication for a number of user equipments (UEs). UEs many include, for example, mobile stations (STA), laptops, cell phones, PDAs, tablets, etc. A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a method for wireless communication by a mobile device includes determining a uplink resource block configuration comprising at least one set of resource blocks uniformly distributed in a portion of a bandwidth occupying at least a minimum predetermined bandwidth threshold, and sending a transmission in the at least one set of resource blocks.

In one aspect of the disclosure, a method for wireless communication operable by a mobile device includes broadcasting an indication comprising a channel use beacon signal (CUBS) transmission for channel utilization in response to detecting a clear channel in a clear channel assessment (CCA) occasion, wherein the clear channel is defined as an energy level below a threshold or no detection of a CUBS signal, and continuously transmitting on at least one subframe succeeding the CUBS transmission.

In one aspect of the disclosure, a method for wireless communication operable by a mobile device includes determining a uplink resource block configuration comprising at least a first set of dynamically scheduled resource blocks and at least a second resource block over a predetermined set of resource blocks on the edge of the channel bandwidth, the resource block configuration occupying at least a minimum predetermining bandwidth threshold, and sending a transmission in the at least one of the resource block in the first set and one of the resource block in the second set.

In one aspect of the disclosure, a method for wireless communication operable by a mobile device includes determining a plurality of channel utilization resource blocks assigned to a plurality of mobile devices, the assigned determined by time division multiplexing, performing a first clear channel assessment (CCA), wherein the CCA occasion occupies a fraction of an OFDM symbol duration, if CCA is successful, broadcasting an indication for channel utilization as a channel use beacon signal (CUBS) based on the determination, wherein the CUBS transmission are aligned to a predetermined OFDM symbol boundary, if receiving a grant for transmission on non-contiguous transmission performing at least a second CCA before each non-contiguous transmission, and if the second CCA is successful, transmitting the scheduled transmission without transmitting CUBS.

In one aspect of the disclosure, a method of wireless communication includes selecting, by a base station, one or more downlink subframes for transmission of a joint control channel for variable transmission time interval (TTI) transmission over multiple uplink subframes in an unlicensed carrier, setting, by the base station, a size of the joint control channel, selecting, by the base station, an aggregation level for association with the joint control channel, and transmitting, by the base station, the joint control channel over the one or more selected downlink subframes.

In an additional aspect of the disclosure, a method of wireless communication includes receiving, by a UE from a base station over one or more downlink subframes, a joint control channel for variable TTI transmission over multiple uplink subframes in an unlicensed carrier, and transmitting, by the UE the variable TTI transmission over the multiple uplink subframes according to the joint control channel.

In an additional aspect of the disclosure, a method of wireless communications includes preparing, by a base station, control information indicating a transmission grant to one or more UEs for variable TTI transmission over a plurality of uplink subframes in an unlicensed carrier, wherein the preparing includes: providing a cross-carrier scheduling indicator identifying one or more uplink component carriers to which the transmission grant applies, wherein the cross-carrier scheduling indicator applies across each of the plurality of uplink subframes, providing a resource allocation for the transmission grant, providing a modulation and coding scheme and redundancy version for each of the plurality of uplink subframes, providing a new data indicator for each of the plurality of uplink subframes scheduled for new uplink transmissions, providing a transmission power control signal for the variable TTI transmission, providing phase information to maintain orthogonality between layers in the variable TTI transmission, providing downlink assignment indications identifying a number of expected acknowledgments from the base station, and providing one or more channel state requests and one or more sounding reference signal, and transmitting, by the base station, the control information to the one or more UEs.

In an additional aspect of the disclosure, a method of wireless communications includes receiving, by a UE, control information indicating a transmission grant from a base station for variable TTI transmission over a plurality of uplink subframes in an unlicensed carrier, preparing, by the UE, for the variable TTI transmission using the control information, wherein the control information includes: a cross-carrier scheduling indicator identifying one or more uplink component carriers to which the transmission grant applies, wherein the cross-carrier scheduling indicator applies across each of the plurality of uplink subframes, a resource allocation for the transmission grant, a modulation and coding scheme and redundancy version for each of the plurality of uplink subframes, a new data indicator for each of the plurality of uplink subframes scheduled for new uplink transmissions, a transmission power control signal for the variable TTI transmission, phase information to maintain orthogonality between layers in the variable TTI transmission, downlink assignment indications identifying a number of expected acknowledgments from the base station, and one or more channel state requests and one or more sounding reference signal, and transmitting, by the UE, the variable TTI transmissions over the plurality of uplink subframes according to the control information.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as UEs or access terminals of various types used for wireless communications. Similarly, an article of manufacture may be provided, including a non-transitory computer-readable medium holding encoded instructions that when executed by a processor, cause a wireless communications apparatus to perform the methods and aspects of the methods as summarized above.

BRIEF DESCRIPTION OF THE DRAWINGS

FIG. 6A illustrates a contiguous carrier aggregation.

FIG. 6B illustrates a non-contiguous carrier aggregation.

FIG. 15 illustrates example configurations using a narrow band waveform with mirror hopping and a multi-cluster configuration.

FIG. 16 illustrates example configurations using a waveform combining TDM and FDM.

FIG. 18 illustrates example configurations using an FDM waveform.

FIG. 19 illustrates example configurations using a CDM waveform.

DETAILED DESCRIPTION

Figure 1:
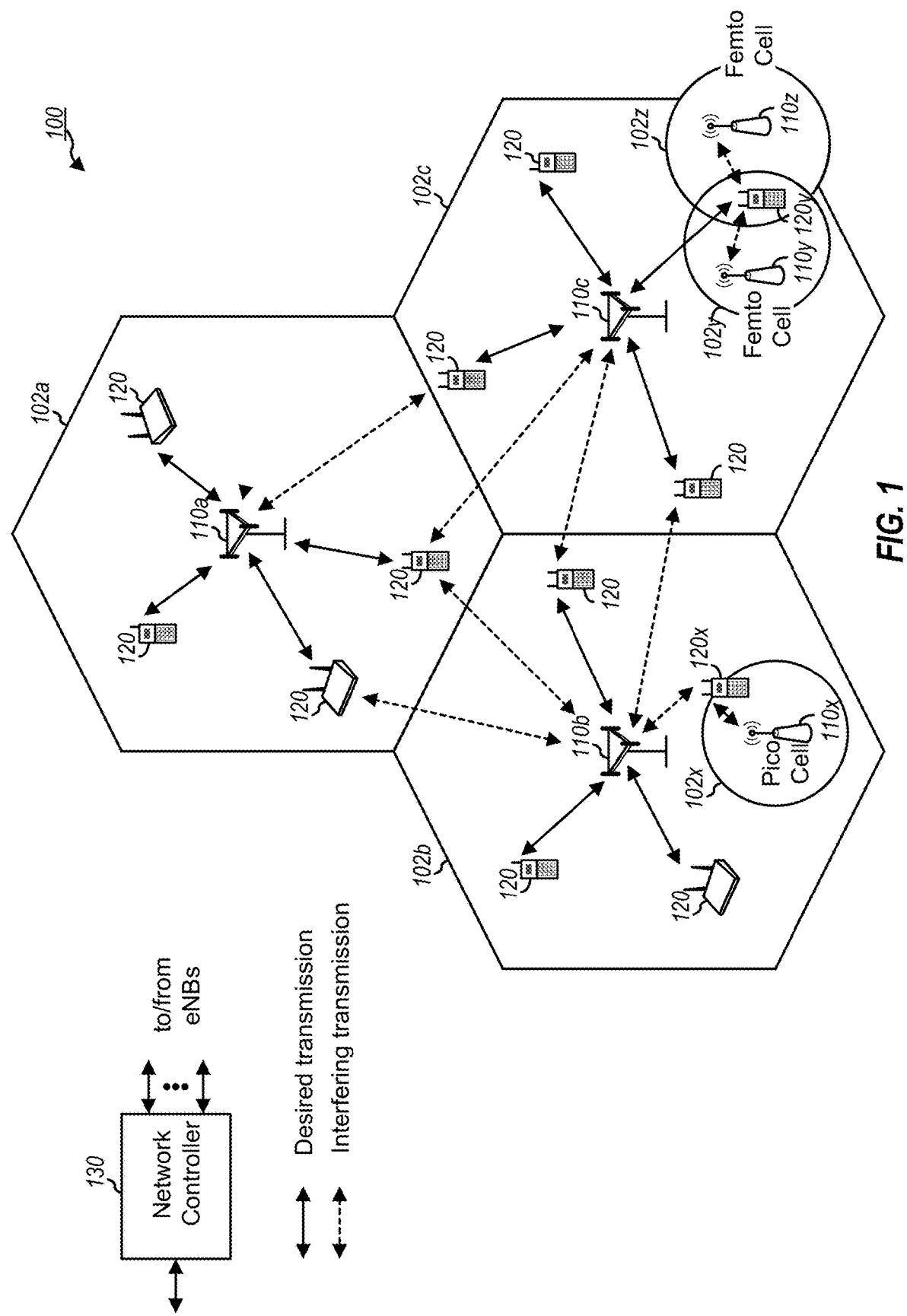
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein are not limited to LTE, and may also be used for various wireless communication networks and systems such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned as well as other wireless networks and radio technologies. For clarity, certain aspects of the techniques are described below for LTE, and LTE terminology is used in much of the description below.

Operators have so far looked at WiFi as the primary mechanism to use unlicensed spectrum to relieve ever increasing levels of congestion in cellular networks. However, a new carrier type (NCT) based on LTE in an unlicensed spectrum (LTE-U) may be compatible with carrier-grade WiFi, making LTE-U an alternative to WiFi. LTE-U may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE-U may perform significantly better than WiFi. For example, an all LTE-U deployment (for single or multiple operators) compared to an all WiFi deployment, or when there are dense small cell deployments, LTE-U may perform significantly better than WiFi. LTE-U may perform better than WiFi in other scenarios such as when LTE-U is mixed with WiFi (for single or multiple operators).

In accordance with one or more aspects of the disclosure, there are provided methods and apparatuses for operating LTE devices in the unlicensed band. For example, the operations may include methods for improved uplink and downlink waveforms for operating LTE in the unlicensed band.

LTE may provide several operational modes. For operation in the unlicensed spectrum, LTE may be referred to as LTE-U. LTE-U may provide a supplemental downlink (SDL) mode for use by existing licensed spectrum service providers (traditional MNO). The SDL may be used for downlink capacity offload. In another mode, carrier aggregation (CA) may be used by existing licensed spectrum service providers (traditional MNO). The CA mode may be used for downlink and uplink capacity offload. In another mode called standalone (SA) mode, no licensed spectrum may be used by a service provider. The SA mode may be used by venue (e.g., a sports stadium) operators or MVNOs. SA mode may be used for in-stadium access or for non-traditional wireless access, or in an enterprise setting.

For a single service provider (SP), an LTE-U network on an unlicensed spectrum may be configured to be synchronous with a LTE network on the licensed spectrum. However, LTE-U networks deployed on a given channel by multiple SPs may be configured to be synchronous across the multiple SPs. One approach to incorporate both the above features may involve using a constant timing offset between LTE and LTE-U for a given SP. An LTE-U network may provide unicast and/or multicast services according to the needs of the SP. Moreover, an LTE-U network may operate in a bootstrapped mode in which LTE cells act as anchor and provide relevant LTE-U cell information (e.g., radio frame timing, common channel configuration, system frame number or SFN, etc.). In this mode, there may be close interworking between LTE and LTE-U. For example, the bootstrapped mode may support the supplemental downlink and the carrier aggregation modes described herein. The PHY-MAC layers of the LTE-U network may operate in a standalone mode in which the LTE-U network operates independently from an LTE network. In this case, there may be a loose interworking between LTE and LTE-U based on RLC-level aggregation with co-located LTE/LTE-U cells, or multiflow across multiple cells and/or base stations, for example.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

In some embodiments, the system 100 is an LTE/LTE-A network that supports one or more LTE-U modes of operation or deployment scenarios. In other embodiments, the system 100 may support wireless communications using an unlicensed spectrum and an access technology different from LTE-U, or a licensed spectrum and an access technology different from LTE/LTE-A. The terms evolved Node B (eNB) and user equipment (UE) may be generally used to describe the base stations 110 and devices 120, respectively. The system 100 may be a Heterogeneous LTE/LTE-A/LTE-U network in which different types of eNBs provide coverage for various geographical regions.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

In some embodiments of the system 100, various deployment scenarios for LTE-U may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 110 as well as UEs 120 may support one or more of these or similar modes of operation. OFDMA communications signals may be used in the communications links for LTE downlink transmissions in an unlicensed spectrum, while SC-FDMA communications signals may be used in the communications links for LTE uplink transmissions in an unlicensed spectrum. Additional details regarding the implementation of LTE-U deployment scenarios or modes of operation in a system such as the system 100, as well as other features and functions related to the operation of LTE-U, are provided below with reference to FIGS. 2A-31.

Figure 2A:
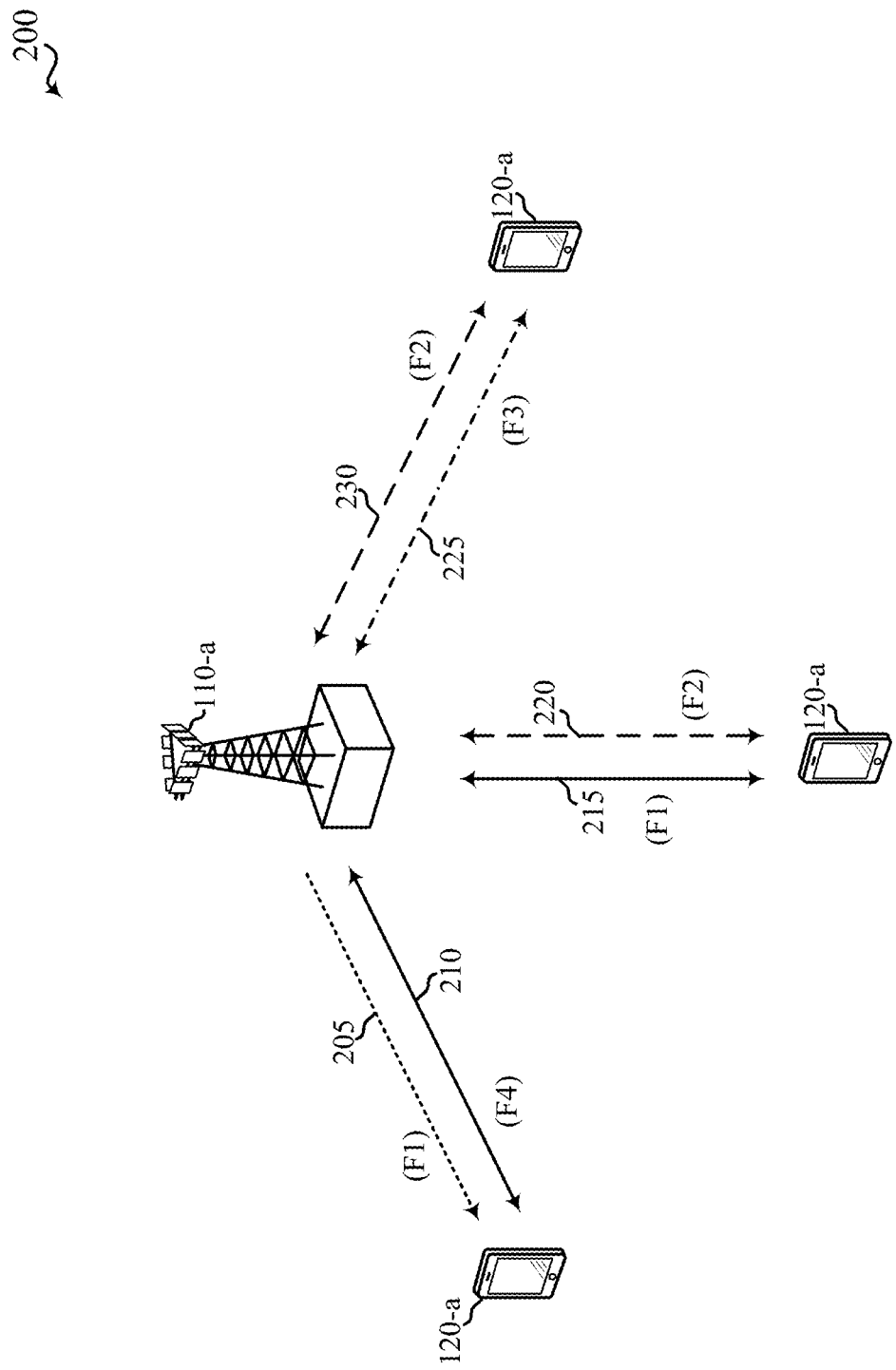
FIG. 2A is a diagram illustrating examples of deployment scenarios for using LTE in an unlicensed spectrum.

Turning next to FIG. 2A, a diagram 200 shows examples of a supplemental downlink mode and of a carrier aggregation mode for an LTE network that supports LTE-U. The diagram 200 may be an example of portions of the system 100 of FIG. 1. Moreover, the base station 110-a may be an example of the base stations 110 of FIG. 1, while the UEs 120-a may be examples of the UEs 120 of FIG. 1.

In the example of a supplemental downlink mode in diagram 200, the base station 110-a may transmit OFDMA communications signals to a UE 120-a using a downlink 205. The downlink 205 is associated with a frequency F1 in an unlicensed spectrum. The base station 110-a may transmit OFDMA communications signals to the same UE 120-a using a bidirectional link 210 and may receive SC-FDMA communications signals from that UE 120-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 110-a. In some embodiments, the downlink 205 may be used for unicast services (e.g., addressed to one UE) or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 110-a may transmit OFDMA communications signals to a UE 120-a using a bidirectional link 215 and may receive SC-FDMA communications signals from the same UE 120-a using the bidirectional link 215. The bidirectional link 215 is associated with the frequency F1 in the unlicensed spectrum. The base station 110-a may also transmit OFDMA communications signals to the same UE 120-a using a bidirectional link 220 and may receive SC-FDMA communications signals from the same UE 120-a using the bidirectional link 220. The bidirectional link 220 is associated with a frequency F2 in a licensed spectrum. The bidirectional link 215 may provide a downlink and uplink capacity offload for the base station 110-a. Like the supplemental downlink described herein, this scenario may occur with any service provider (e.g., MNO) that uses a licensed spectrum and needs to relieve some of the traffic and/or signaling congestion.

In another example of a carrier aggregation mode in diagram 200, the base station 110-a may transmit OFDMA communications signals to a UE 120-a using a bidirectional link 225 and may receive SC-FDMA communications signals from the same UE 120-a using the bidirectional link 225. The bidirectional link 225 is associated with the frequency F3 in an unlicensed spectrum. The base station 110-a may also transmit OFDMA communications signals to the same UE 120-a using a bidirectional link 230 and may receive SC-FDMA communications signals from the same UE 120-a using the bidirectional link 230. The bidirectional link 230 is associated with the frequency F2 in the licensed spectrum. The bidirectional link 225 may provide a downlink and uplink capacity offload for the base station 110-a. This example and those provided herein are presented for illustrative purposes and there may be other similar modes of operation or deployment scenarios that combine LTE and LTE-U for capacity offload.

As described herein, the typical service provider that may benefit from the capacity offload offered by using LTE-U (LTE in an unlicensed band) is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE-U secondary component carrier (SCC) on the unlicensed spectrum.

In the supplemental downlink mode, control for LTE-U may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE-U (e.g., bidirectional links 215 and 225). The carrier aggregation mechanisms supported when using LTE-U may fall under a hybrid frequency division duplexing-time division duplexing (FDD-TDD) carrier aggregation or a TDD-TDD carrier aggregation with different symmetry across component carriers.

Figure 2B:
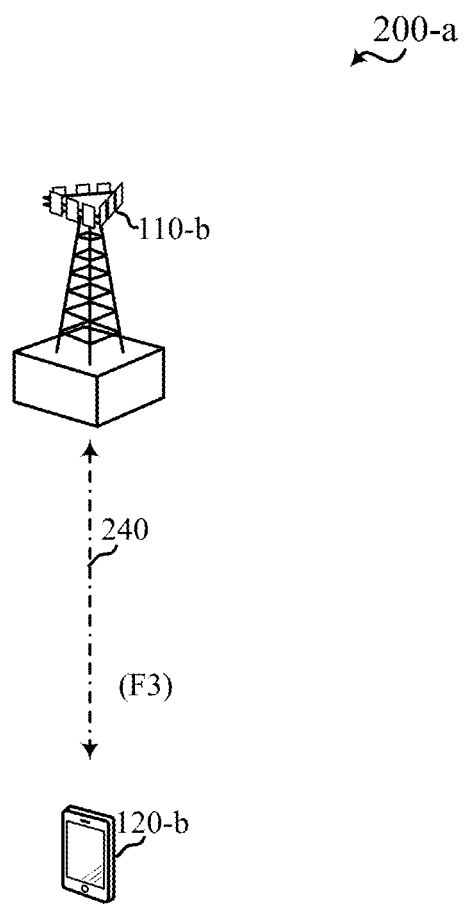
FIG. 2B is a diagram illustrating examples of deployment scenarios for using LTE in an unlicensed spectrum.

FIG. 2B shows a diagram 200-a that illustrates an example of a standalone mode for LTE-U. The diagram 200-a may be an example of portions of the system 100 of FIG. 1. Moreover, the base station 110-b may be an example of the base stations 110 of FIG. 1 and the base station 110-a of FIG. 2A, while the UE 120-b may be an example of the UEs 120 of FIG. 1 and the UEs 120-a of FIG. 2A.

In the example of a standalone mode in diagram 200-a, the base station 110-b may transmit OFDMA communications signals to the UE 120-b using a bidirectional link 240 and may receive SC-FDMA communications signals from the UE 120-b using the bidirectional link 240. The bidirectional link 240 is associated with the frequency F3 in an unlicensed spectrum described herein with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE-U PCC on the unlicensed spectrum. Moreover, LBT may be implemented on both the base station and the UE.

Figure 3:
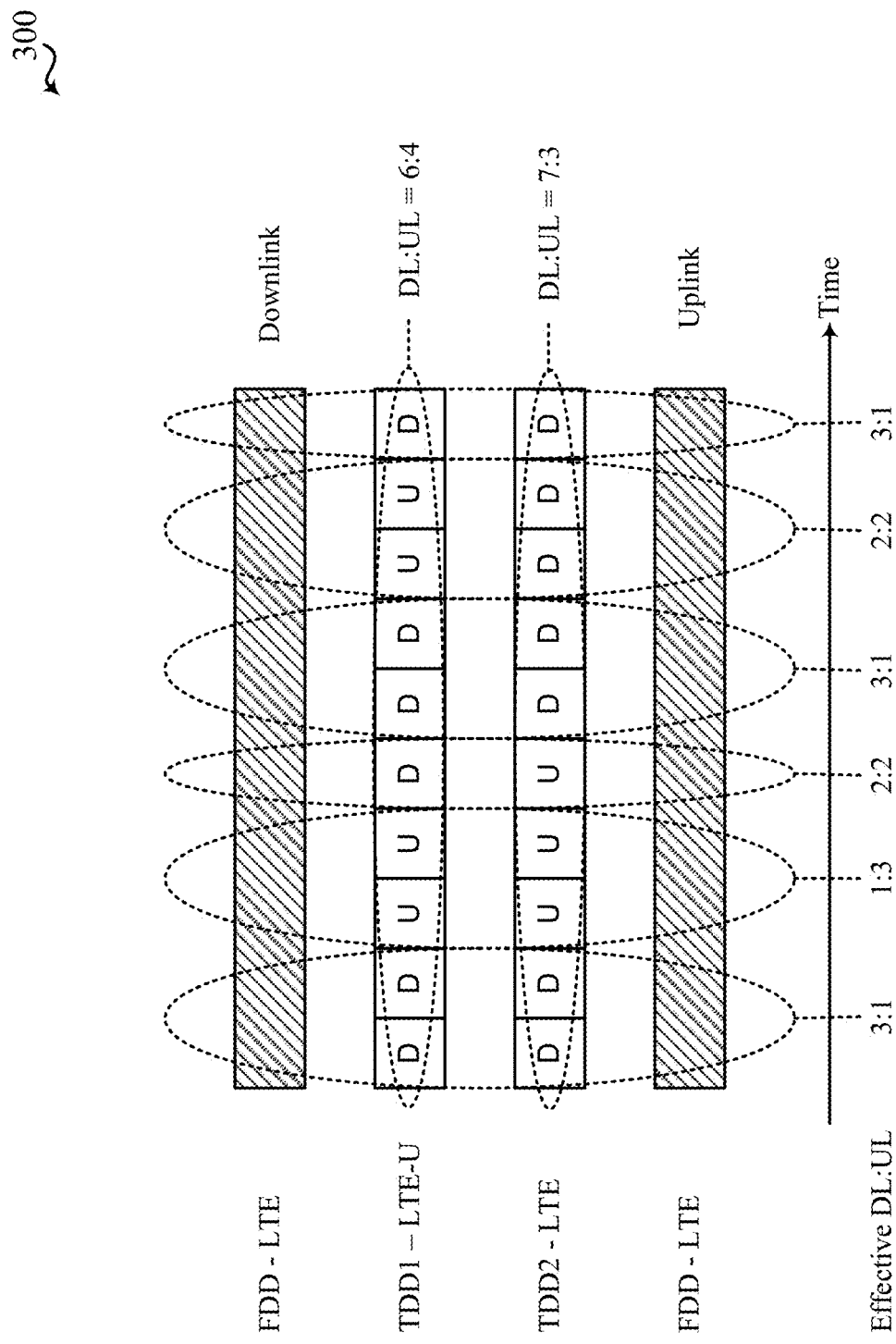
FIG. 3 is a diagram illustrating examples of carrier aggregation when using LTE concurrently in licensed and unlicensed spectrum.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described herein with reference to FIG. 2A. This type of carrier aggregation may be used in at least portions of the system 100 of FIG. 1. Moreover, this type of carrier aggregation may be used in the base stations 110 and 110-a of FIG. 1 and FIG. 2A, respectively, and/or in the UEs 120 and 120-a of FIG. 1 and FIG. 2A, respectively.

In this example, an FDD (FDD-LTE) may be performed in connection with LTE in the downlink, a first TDD (TDD1) may be performed in connection with LTE-U, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE and LTE-U.

Figure 4:
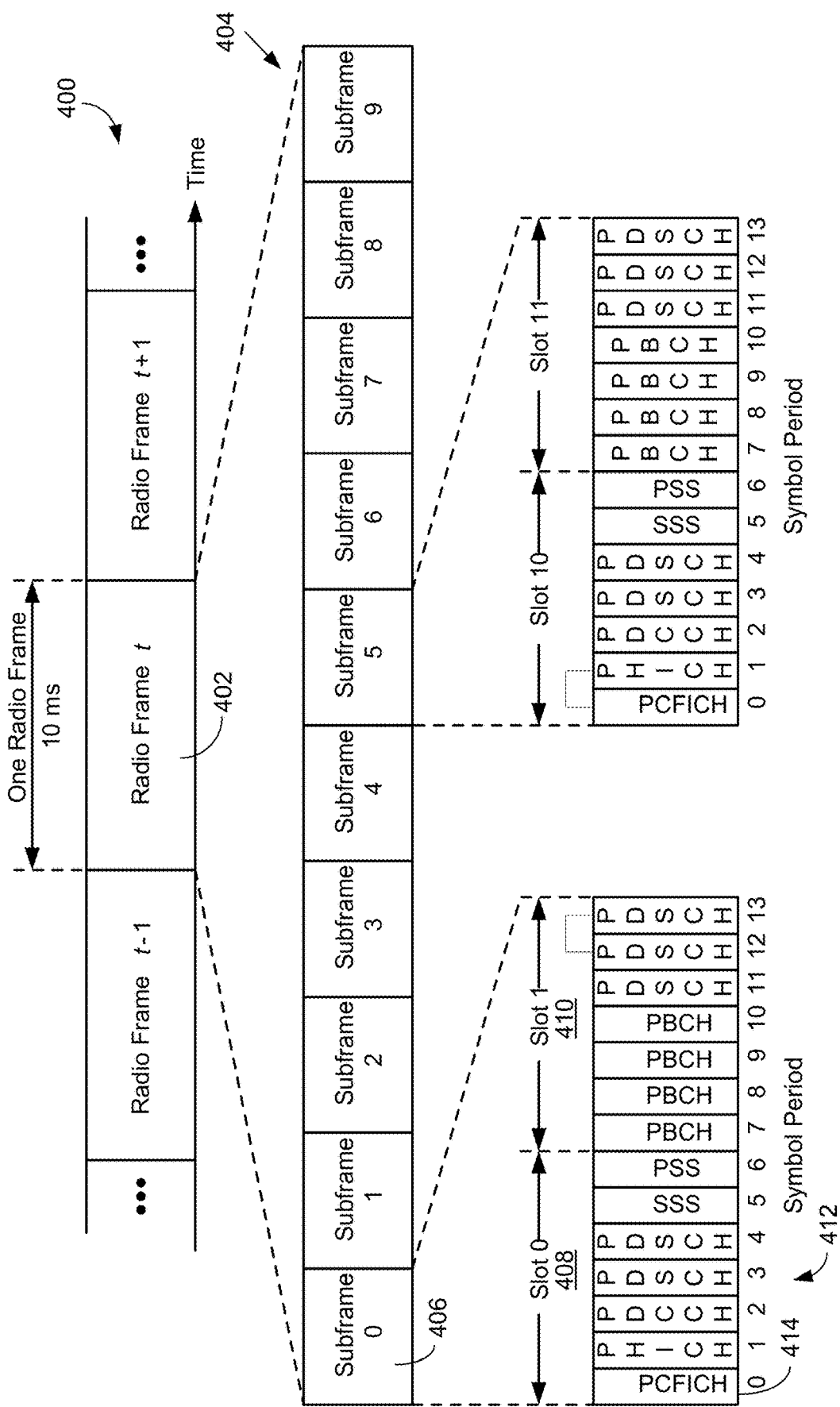
FIG. 4 is a block diagram illustrating examples of a downlink frame structure in a telecommunications system.

FIG. 4 shows a downlink frame structure used in LTE. The transmission timeline for the downlink may be partitioned into units of radio frames 400. Each radio frame, for example, frame 402, may have a predetermined duration (e.g., 10 milliseconds (ms)) and may be partitioned into 10 subframes 404 with indices of 0 through 9. Each subframe, for example 'Subframe 0' 406, may include two slots, for example, 'Slot 0' 408 and 'Slot 1' 410. Each radio frame may thus include 20 slots with indices of 0 through 19. Each slot may include 'L' symbol periods, e.g., 7 symbol periods 412 for a normal cyclic prefix (CP), as shown in FIG. 4, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB 110 may send a primary synchronization signal (PSS) and a secondary synchronization signal (SSS) for each cell in the eNB 110. The primary and secondary synchronization signals may be sent in symbol periods 6 and 5, respectively, in each of subframes 0 and 5 of each radio frame with the normal cyclic prefix, as shown in FIG. 4. The synchronization signals may be used by UEs for cell detection and acquisition. The eNB 110 may send a Physical Broadcast Channel (PBCH) in symbol periods 0 to 3 in slot 1 of subframe 0. The PBCH may carry certain system information.

The eNB 110 may send a Physical Control Format Indicator Channel (PCFICH) in only a portion of the first symbol period of each subframe, although depicted in the entire first symbol period 414 in FIG. 4. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 4, M=3. The eNB 110 may send a Physical H-ARQ Indicator Channel (PHICH) and a Physical Downlink Control Channel (PDCCH) in the first M symbol periods of each subframe (M=3 in FIG. 4). The PHICH may carry information to support hybrid automatic retransmission (H-ARQ). The PDCCH may carry information on resource allocation for UEs and control information for downlink channels. Although not shown in the first symbol period in FIG. 4, it is understood that the PDCCH and PHICH are also included in the first symbol period. Similarly, the PHICH and PDCCH are also both in the second and third symbol periods, although not shown that way in FIG. 4. The eNB 110 may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB 110 may send the PSS, SSS and PBCH in the center 1.08 MHz of the system bandwidth used by the eNB 110. The eNB 110 may send the PCFICH and PHICH across the entire system bandwidth in each symbol period in which these channels are sent. The eNB 110 may send the PDCCH to groups of UEs in certain portions of the system bandwidth. The eNB 110 may send the PDSCH to specific UEs in specific portions of the system bandwidth. The eNB 110 may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB 110 may send the PDCCH to the UE in any of the combinations that the UE will search.

Figure 5:
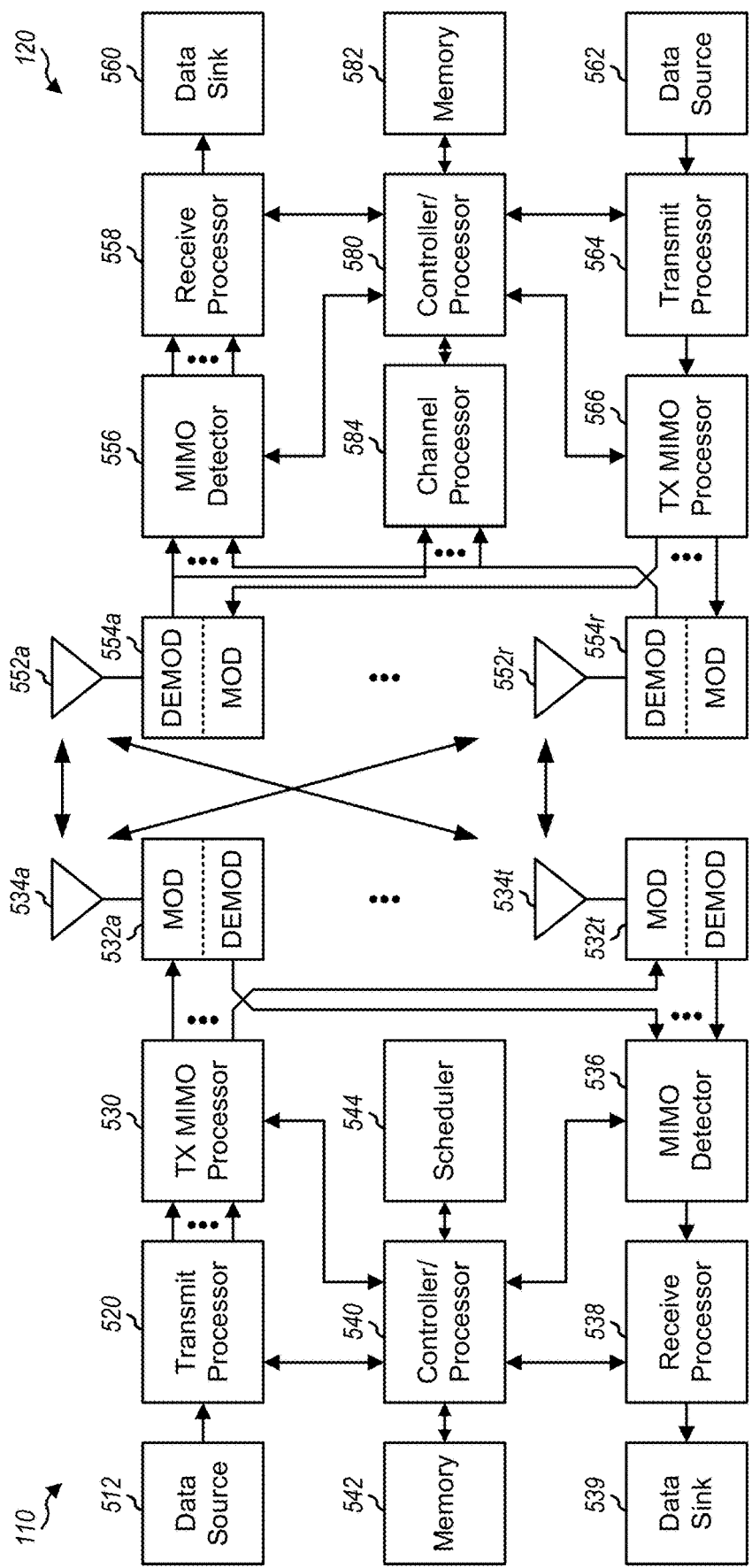
FIG. 5 is a block diagram illustrating a design of a base station/eNB and a UE.

FIG. 5 shows a block diagram of a design of a base station/eNB 110 and a UE 120, which may be one of the base stations/eNBs 110 and one of the UEs 120 in FIG. 1. The base station 110 may also be a base station of some other type. The base station 110 may be equipped with antennas 534a through 534t, and the UE 120 may be equipped with antennas 552a through 552r.

At the base station 110, a transmit processor 520 may receive data from a data source 512 and control information from a controller/processor 540. The control information may be for the PBCH, PCFICH, PHICH, PDCCH, etc. The data may be for the PDSCH, etc. The processor 520 may process (e.g., encode and symbol map) the data and control information to obtain data symbols and control symbols, respectively. The processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive downlink signals from the base station 110 and/or neighboring base stations and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the modulators 554a through 554r (e.g., for SC-FDM, etc.), and transmitted to the base station 110. At the base station 110, the uplink signals from the UE 120 may be received by the antennas 534, processed by the demodulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the base station 110 and the UE 120, respectively. The processor 540 and/or other processors and modules at the base station 110 may perform or direct the execution of various processes for the techniques described herein. The processor 580 and/or other processors and modules at the UE 120 may also perform or direct the execution of the functional blocks illustrated in FIGS. 11B, 12B, 20, 21, 22 and 23 and/or other processes for the techniques described herein. The processor 540 and/or other processors and modules at the eNB 110 may perform or direct the execution of the functional blocks illustrated in FIGS. 11A and 12A and/or other processes for the techniques described herein. The memories 542 and 582 may store data and program codes for the base station 110 and the UE 120, respectively. A scheduler 544 may schedule UEs for data transmission on the downlink and/or uplink.

As will be readily appreciated, antennas 552, modulators 554, transmit processor 564, and/or TX MIMO processor 566 may form a transmit chain of UE 120 and supply means for sending or transmitting uplink signals under the control of processor 580. For example, the transmit chain may supply means for establishing a connection with a component carrier (e.g., a primary component carrier) of an access point (e.g., an eNB). The transmit chain may supply means sending at least one metric to the access point.

As will be readily appreciated, antennas 552, demodulators 554, receive processor 558, and/or RX MIMO detector 556 may form a receive chain of UE 120 and supply means for receiving a message related to switching on or off a component carrier (e.g., a secondary component carrier).

In one aspect, processor 580 includes modules for performing operations of the methods described herein, by executing instructions held in the memory 582. Such modules, for example, may include means for determining at least one metric associated with a constraint on a transmissions channel of the unlicensed communication band. Such modules, for example, may be utilized by processor 580 to control operation of the respective transmit and receive chains.

In one configuration, the UE 120 for wireless communication may include means for performing the process illustrated in the figures below. In one aspect, the aforementioned means may be the processor(s), the controller/processor 580, the memory 582, the receive processor 558, the MIMO detector 556, the demodulators 554, and the antennas 552 configured to perform the functions recited by the aforementioned means. In another aspect, the aforementioned means may be a module or any apparatus configured to perform the functions recited by the aforementioned means.

FIG. 6A shows an example of contiguous carrier aggregation. K contiguous carriers (CCs) may be available and may be adjacent to each other, where in general K may be any integer value. K may be limited to 5 or less in some LTE Releases. Each CC may have a bandwidth of up to 20 MHz. The overall system bandwidth may be up to 100 MHz when five CCs are supported. FIG. 6B shows an example of non-contiguous carrier aggregation. K CCs may be available and may be separate from each other. Each CC may have a bandwidth of up to 20 MHz. The aggregated carriers may include a primary component carrier (PCC), serving the primary serving cell (PSC or PCell). The primary serving cell may be referred to as the PCell. The aggregated carriers may include a number of secondary component carriers (SCC), each serving a respective secondary serving cell (SSC or SCell).

Figure 7:
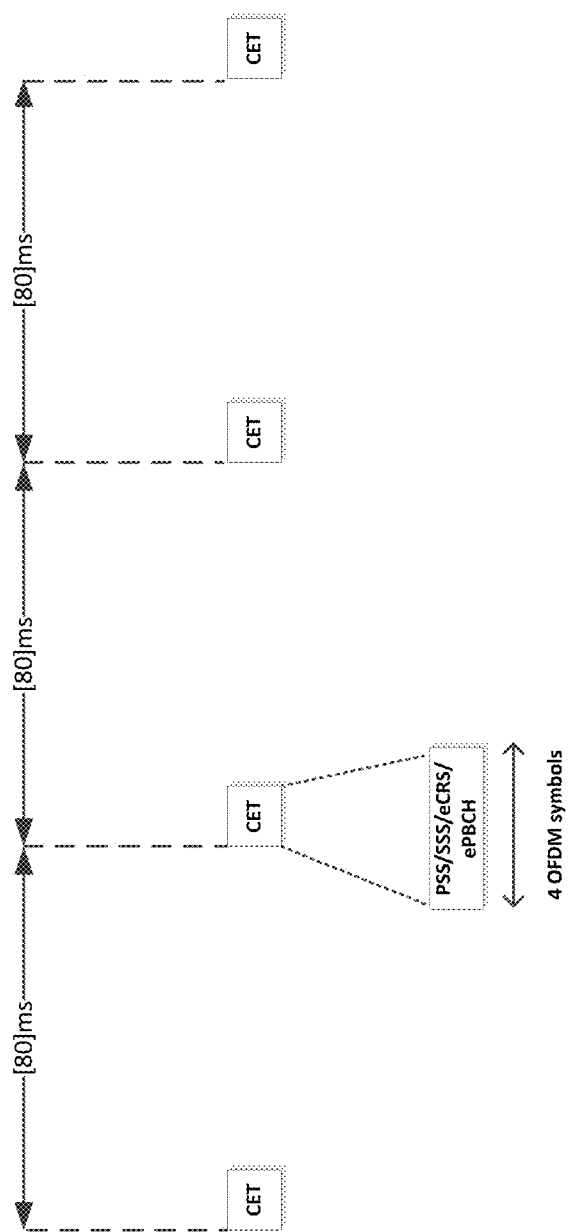
FIG. 7 illustrates example downlink subframe structure for periodic transmissions of clear channel assessment (CCA)-exempt transmissions (CETs).

A downlink frame structure may be utilized for a signal used for tracking loops. In a wireless local area network (WLAN), carrier sense multiple access (CSMA) may be used for medium access control (MAC). Devices sense a channel for ongoing transmissions and begin transmission only if the channel is found to be available or idle. Channel sensing, referred to as clear channel assessment (CCA), may be used for MAC protocols. Certain transmissions may be CCA exempt transmissions (CET) and not subject to CCA constraints. Some examples may include PSS, SSS, enhanced common reference signal (eCRS), enhanced physical broadcast channel (ePBCH). In one example, the CET may be transmitted with a periodicity of 80 ms. FIG. 7 illustrates four CET transmissions at 80 ms intervals. Each CET transmissions may include, e.g., PSS/SSS/eCRS/ePBCH.

Carrier aggregation CA mode may include a design based on CA using either or both licensed spectrum and unlicensed spectrum. In one design, the licensed spectrum may be used as an anchor or primary component carrier (PCC). Control and critical data may be transported on the licensed spectrum. The unlicensed spectrum may be used for data offload providing data-only transmissions. In the downlink and uplink, LTE on the licensed channel may provide both control and data. LTE on the unlicensed channel may provide data.

The designs may include hybrid FDD-TDD CA or TDD-TDD CA, with different DL/UL partition across CCs.

One goal may include minimizing a number of downlink-uplink transitions. For example, every transmitter may need to adhere to listen before talk (LBT) mechanisms.

In LTE-U systems, because the communication system includes operations over unlicensed spectrum, such as WiFi, and the like, there are regulations regarding the level of transmission energy present to constitute occupied bandwidth. Occupied channel bandwidth is defined by sweeping frequency from 0.5% energy to 99.5% energy. In order to be considered occupied bandwidth, the occupied channel bandwidth sweep should be greater than or equal to 0.80× the nominal bandwidth. Thus, an occupied unlicensed spectrum should have a transmissions span of 80% of the nominal bandwidth. SC-FDMA-based uplink signals may not meet this requirement in many cases.

One potential design for uplink signal resource assignment, such as for PUSCH and PUCCH, is multi-cluster SC-FDMA. Multi-cluster SC-FDMA provides for resource block (RB)-level interleaving. As an example, with a minimum interleaving granularity of 10 RBs in a 20 MHz system, the 80% occupancy requirement for occupied channel bandwidth may be met. Thus, channel bandwidth may be considered occupied by multiplexing up to 10 PUSCH or PUCCH channels in a 20 MHz system.

Figure 8:
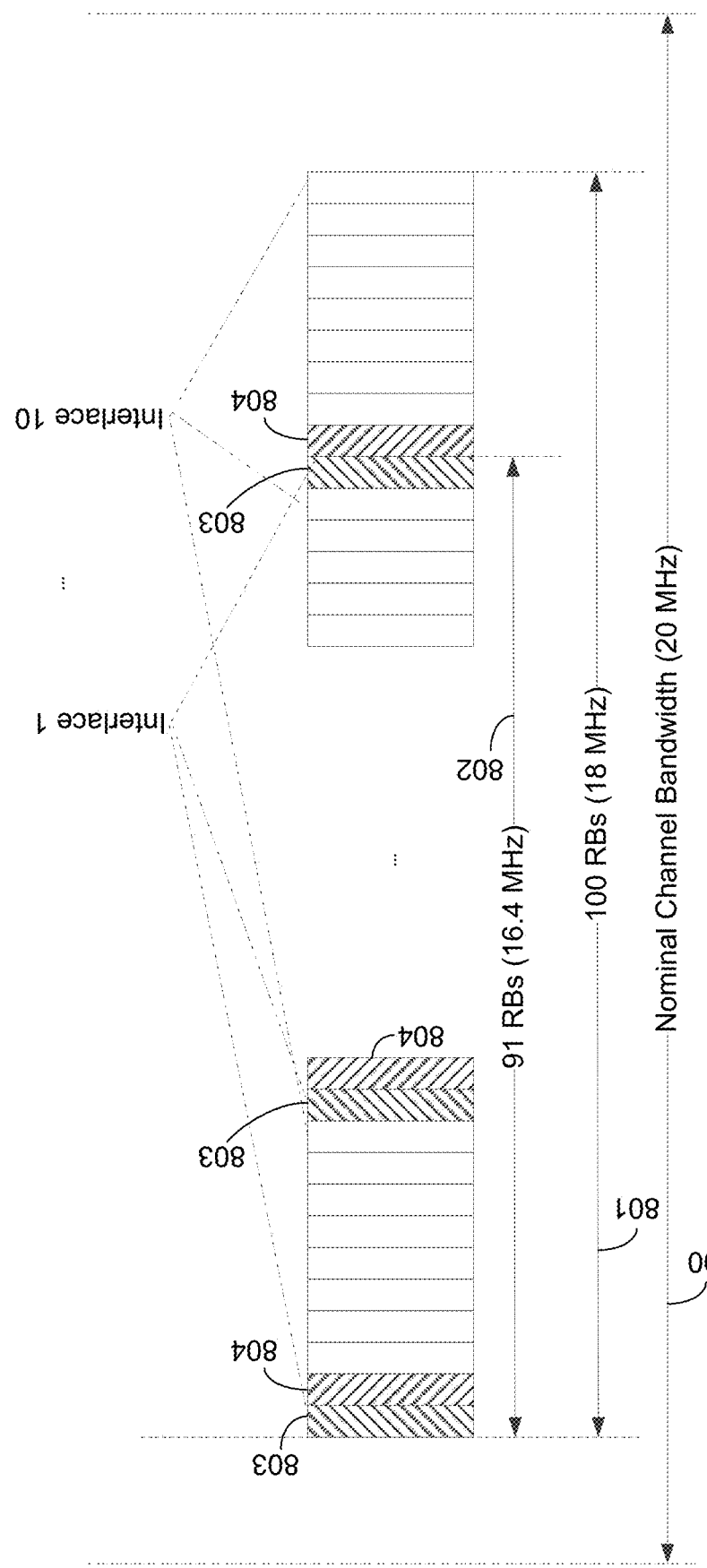
FIG. 8 is a block diagram illustrating an uplink transmission stream configured for multi-cluster SC-FDMA transmissions.

FIG. 8 is a block diagram illustrating an uplink transmission stream configured for multi-cluster SC-FDMA transmissions. A nominal channel bandwidth 800 is illustrated for a 20 MHz LTE-U deployment. Actual channel bandwidth 801 represents 100 RBs, which represents an actual usable bandwidth of approximately 18 MHz. In order to be considered occupied channel bandwidth, uplink transmissions should span at least 80% of nominal channel bandwidth 800. Occupied channel bandwidth 802 is illustrated having 91 RBs, representing approximately 16.4 MHz. Thus, for uplink transmissions, including PUSCH transmissions, 10 PUSCH channels may be multiplexed with the minimum interleaving granularity of 10 RBs to successfully meet the occupied bandwidth requirements. Thus, Interlace 1 through Interlace 10, including the interleaving of uplink transmission RBs 803 and 804 across occupied channel bandwidth 802, would meet the occupied bandwidth requirements for unlicensed spectrum in LTE-U deployments.

Uplink signals, such as PUCCH and PUSCH signals, are typically based on localized frequency division multiplexing (LFDM) waveforms that occupy a set of subcarriers where a different modulation symbol is sent for each subcarrier or some precoding is done before sending the frequency domain waveform. When using these waveforms, small amounts of data available to be sent result in a small portion of the spectrum is occupied. Because of limitations in transmit power spectral density (TX-PSD), when occupying a small part of the bandwidth a small amount of power is transmitted. As noted herein, the occupied bandwidth requirements would suggest that such uplink transmissions may need to occupy a percentage of the entire waveform. However, if most of the waveform is occupied and does not leave any unused subcarriers, it may not be possible to multiplex different users for a given amount of bandwidth. The multi-clustering of SC-FDMA signals provides for each transmitter to interleave its signals so that the signals occupy every 1-out-of-every-Nth subcarrier (e.g., 1-out-of-10, 1-out-of-12, and the like), thereby leaving many subcarriers in the middle unoccupied. This multi-cluster SC-FDMA approach may increase the nominal bandwidth occupancy to enable sending the waveform with a higher power (but still with low enough PSD to meet regulations). Interleaved frequency division multiplexing (IFDM) and interleaved orthogonal frequency division multiplexing (I-OFDM) signals may be used that occupy 1-out-of-Nth subcarrier in order to send signals confined to those subcarriers.

Figure 9:
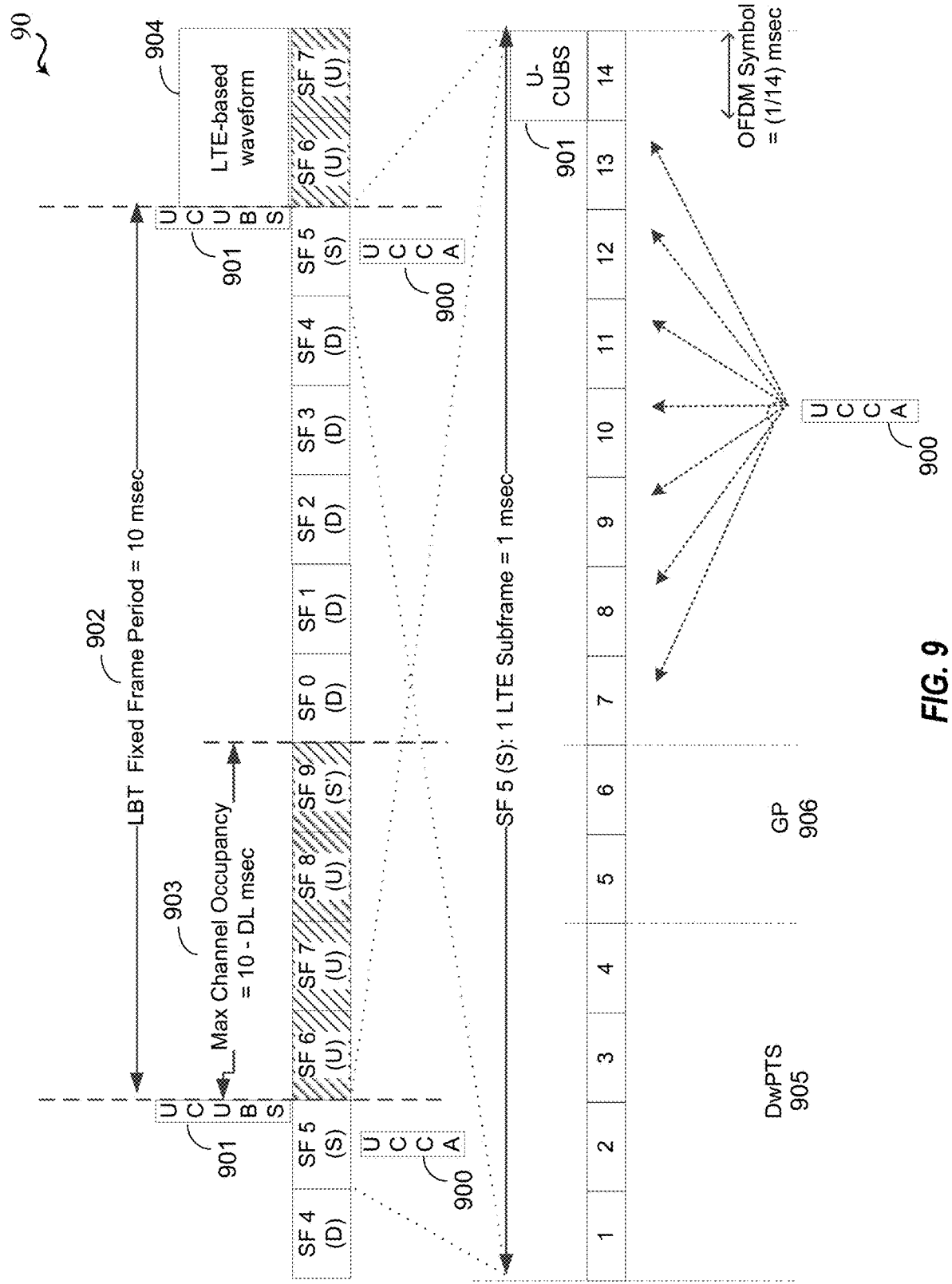
FIG. 9 is a block diagram illustrating an uplink transmission stream for an unlicensed carrier band in an LTE-U communication system.

Prior to any uplink transmissions in an LTE-U system, the UE performs a clear channel access (CCA) assessment. If the CCA is detected to be clear, then the UE may proceed with the uplink transmissions on the particular carrier that returns a clear CCA. FIG. 9 is a block diagram illustrating an uplink transmission stream 90 for an unlicensed carrier band in an LTE-U communication system. The illustrated portion of uplink transmission stream 90 shows parts of two uplink transmission frames configured with three uplink subframes (subframes (SF) 6-8) and an S' subframe, which may include uplink symbols before transitioning to the first subframe of the next frame at SF 0. As uplink transmission stream 90 is for transmission over an unlicensed carrier, the transmitting UE would perform uplink CCA (UCCA) checks 900 prior to transmitting any data on SF 6-SF 9. Seven slots are available for uplink CCA checks 900 in the SF 5 S subframe after downlink pilot time slot (DwPTS) 905 and guard period (GP) 906. These seven slots would then leave the final slot for the uplink channel use beacon signal (uplink CUBS or UCUBS) 901, indicating an occupied bandwidth.

The listen before talk (LBT) procedures provide that a CCA check should be performed after every LBT fixed frame period 902. The current LBT fixed frame period 902 is 10 ms. Thus, according to the frame configuration illustrated in FIG. 9, maximum channel occupancy 903 results in the LBT fixed frame period (currently 10 ms) minus the downlink transmission time, that occurs over SF 0 through SF 4. When the CCA check for any of the seven slots of SF 5 is detected for clear transmission, the UE would transmit LTE-based waveform 904 on uplink subframes beginning with SF 6 and SF 7.

Figure 10:
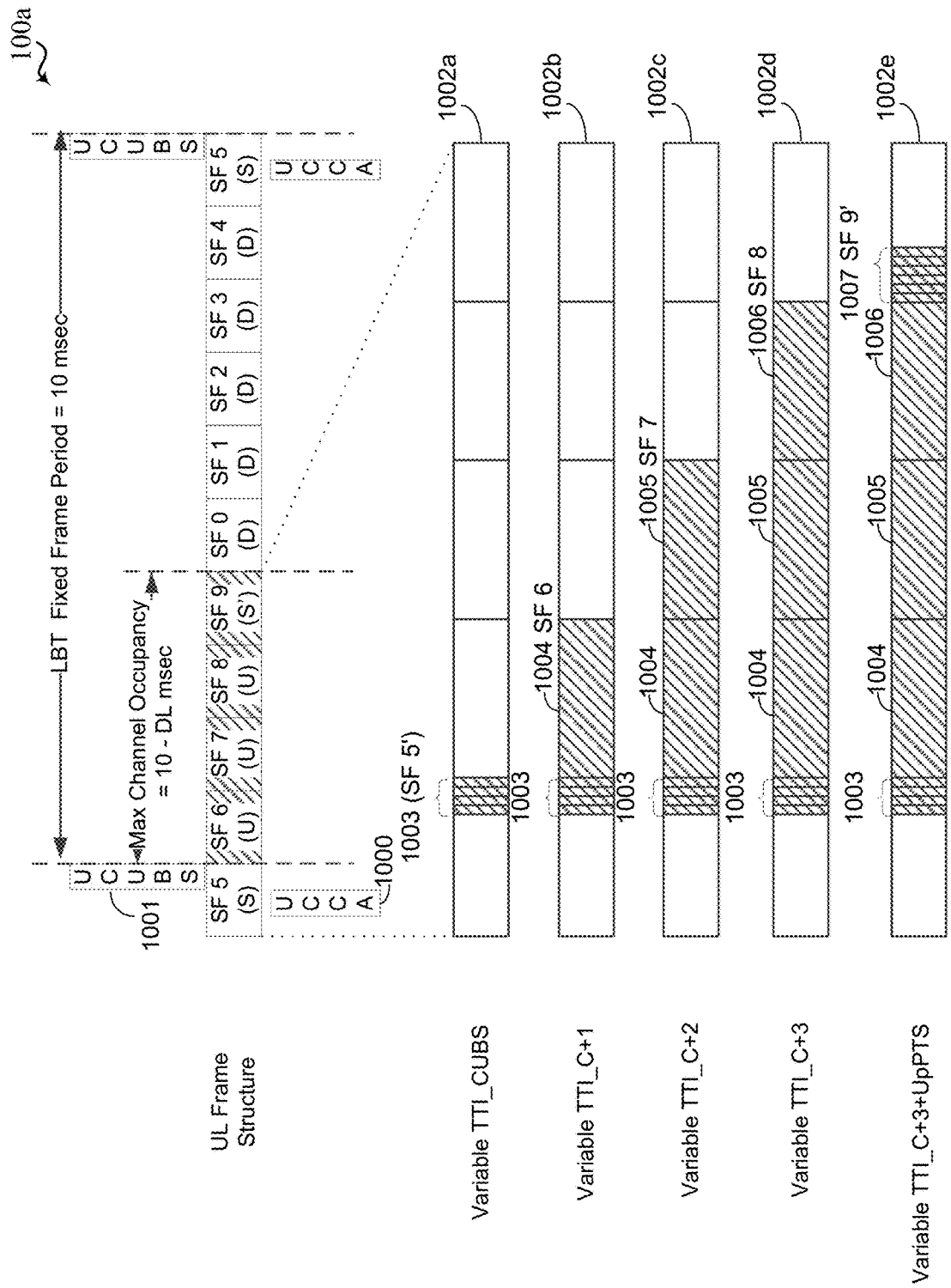
FIG. 10 is a block diagram illustrating an uplink transmission stream for an unlicensed carrier band in an LTE-U communication system.
Figure 11:
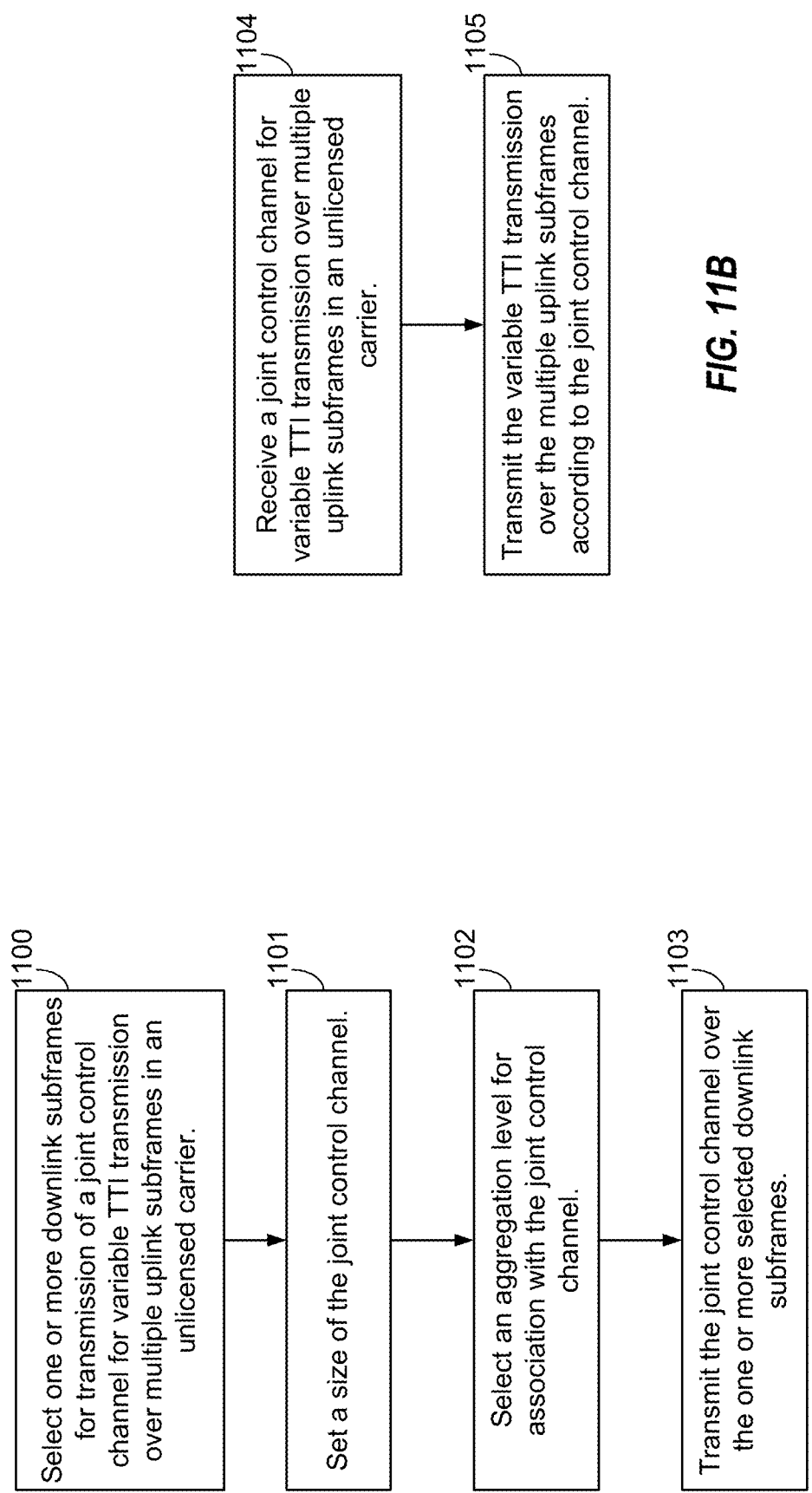
FIGS. 11A and 11B illustrate aspects of a methodology for communication in an LTE-U communication system.
Figure 12:
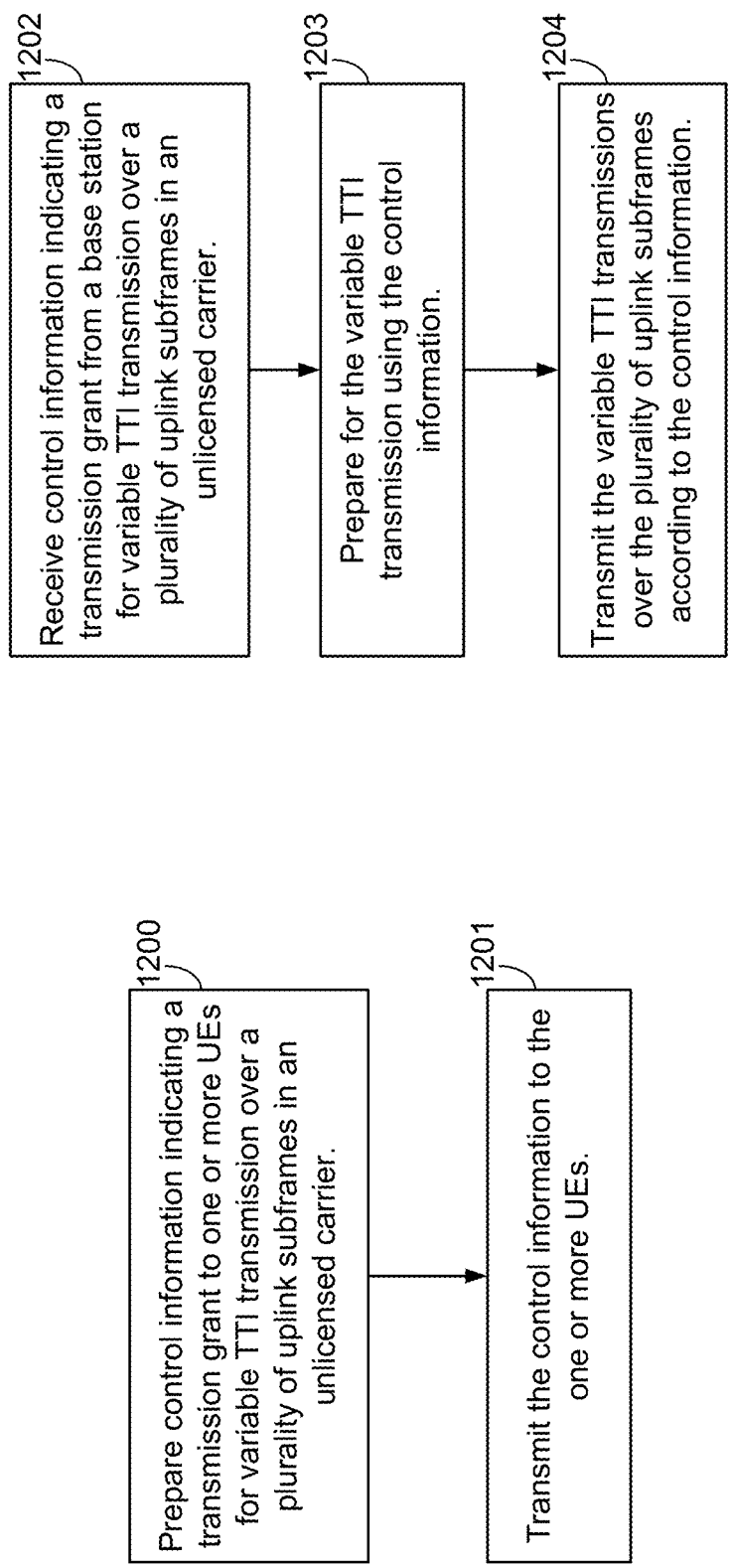
FIGS. 12A and 12B illustrate aspects of a methodology for communication in an LTE-U communication system.

In order to accommodate the variable uplink transmission length for uplink transmissions over the unlicensed carriers in LTE-U systems, variable transmission time interval (TTI) continuous transmission may be employed in order to meet the LBT regulation of continuous transmission after successful CCA check. FIG. 10 is a block diagram illustrating uplink transmission stream 100a for an unlicensed carrier in an LTE-U communication system. The illustrated portion of uplink transmission stream 100a shows parts of two uplink transmission frames configured with three uplink subframes (subframes (SF) 6-8) and an S' subframe, which may include uplink symbols before transitioning to the first subframe of the next frame at SF 0. As uplink transmission stream 100a is for transmission over an unlicensed carrier, the transmitting UE would perform an uplink CCA check 1000 prior to transmitting any data on SF 6-SF 9. After a clear CCA is detected in response to uplink CCA check 1000, there are different options for structuring a variable TTI transmission over multiple slots and subframes. For example, variable TTI transmission 1002a provides for uplink transmissions over the CUBS uplink slots 1003 of the UpPTS after uplink CCA 1000 in SF 5 (SF 5'). Variable TTI transmission 1002b provides for uplink transmissions over CUBS uplink slots 1003 and SF 6 1004. Variable TTI transmission 1002c provides for uplink transmissions over CUBS uplink slots 1003 and two subframes, SF 6 1004 and SF 7 1005. Variable TTI transmission 1002d provides for uplink transmissions over CUBS uplink slots 1003 and three subframes, SF 6 1004, SF 7 1005, and SF 8 1006. Variable TTI transmission 1002e provides for uplink transmission over the entire available uplink resources of CUBS uplink slots 1003, SF 6 1004, SF 7 1005, SF 8 1006, and the UpPTS uplink slots of the special subframe, S', in SF 9 1000 (SF 9').

In LTE uplink communications, two types of uplink resource allocation schemes are supported: Type 0 and Type 1. Type 0 defines contiguous uplink resource allocation within each slot. Slot hopping may be enabled by a one-bit flag, in which, if enabled, allocates resources across different slots. The number of bits used for resource allocation may be determined by the equation:

$$\text{ceiling}(\log_2(N^*(N+1)/2)) \qquad (1)$$

Where is N the number of physical resource blocks (PRBs) in uplink. For example, in a 20 MHz system, N=100 RBs. Therefore, the number of bits for resource allocation according to Equation (1) results in 13 bit.

Type 1 defines dual-cluster uplink resource allocation, without slot hopping. For downlink control information (DCI) format 0, the number of bits for resource allocation is determined by the equation:

$$1+\text{ceiling}(\log_2(N^*(N+1)/2)) \qquad (2)$$

Where, the additional one bit is due to the 1-bit slot hopping flag, which is no longer needed. For DCI format 4, the number of bits for resource allocation is determined by the equation:

$$\max\{\text{ceiling}(\log_2(N^*(N+1)/2)), \text{ceiling}(\log_2(N\text{choose}k\ (\text{ceiling}(N/P)+1,4)))\} \quad (3)$$

Where P is the RB group size, which may be up to 4 RBs depending on system bandwidth, and where Nchoosek denotes the binomial coefficient (n,k), defined as n!/k!/(n−k)!.

In order to support variable TTI continuous transmission in LTE-U systems that allow for uplink communications over unlicensed spectrum, the issue of control channel(s) scheduling for variable TTI transmissions arises. Additionally, because of the additional LBT requirements, existing PUSCH transmission characteristics may be insufficient, such as resource allocation, modulation coding scheme (MCS)/redundancy version (RV), transmission power control (TPC), new data indicator (NDI), and the like.

Two types of control channel design may be considered for variable TTI continuous uplink transmission in LTE-U communication systems. There may either be individual control channels for each uplink subframe of the multiple variable TTI uplink transmission subframes, or joint control channels that include a single control channel for multiple uplink subframes. Due to the requirement that uplink transmissions over unlicensed LTE-U carriers should be continuous after CCA clearance, individual control channels for each uplink subframe may not be preferable. For example, if one uplink individual control channel is missed, the corresponding uplink transmission cannot be performed as intended, and, therefore, the required property for contiguous transmission would not be met. Accordingly, various aspects of the present disclosure provide for joint control channels for variable TTI uplink transmissions.

FIGS. 11A and 11B are functional block diagrams illustrating example blocks executed to implement one aspect of the present disclosure. At block 1100, a base station selects one or more downlink subframes for transmitting a joint control channel for variable TTI transmissions over multiple uplink subframes. A base station that may be configured according to various aspects of the present disclosure may include eNB 110 (FIG. 5), with its components and memory for storing various logic to execute or control the features described herein. The subframe or subframes where the joint control channel is transmitted may be based on hybrid automatic repeat request (HARQ) timing between the control channel subframe and the first uplink subframe for the variable TTI transmission. For example, if the variable TTI transmission begins from subframes n, n+1, . . . , n+k−1, and assuming a typical HARQ 4 ms gap between transmission and acknowledgement, the joint control channel would be transmitted in subframe n−4 if the subframe is a downlink subframe. If the n−4 subframe is not a downlink subframe, then the joint control channel would be transmitted at the first downlink subframe before n−4. A smaller gap than 4 ms may also be possible if the UE is able to detect and decode the control channel and be ready to perform the corresponding uplink transmissions in less than 4 ms.

At block 1101, the base station sets a size of the joint control channel. For a given frame structure, the set of uplink subframes for variable TTI transmissions is designated as M There are two alternative designs for determining the size of the joint control channel. In the first alternative design, a single control size is used that assumes all M uplink subframes are scheduled for transmissions. This alternative helps maintain a desirable maximum number of blind decodes, albeit, at the expense of additional inefficiency in downlink control overhead for different frame structures (e.g., potentially different M scheduled uplink subframes, which can be different).

In a second alternative design, two or more control sizes may be defined that take into account the multiple subframes identified for variable TTI transmission scheduling. For example, M DCI sizes, which correspond to M possible variable TTI scheduling choices (e.g., first 1 subframe, first 2 subframes, . . . , first M subframes), may have additional variations that cover various combinations of scheduled uplink subframes. For example, if M=4, with 4 DCI sizes, the first size may cover scheduling up to two subframes, and the second size covers scheduling either three or four subframes. While this second alternative results in more efficient downlink control overhead management, there is an increased number of blind decodes at the UE.

At block 1102, the base station selects an aggregation level for association with the joint control channel. With the design of the joint control channel providing control information for each of the multiple uplink subframes scheduled for variable TTI transmission, the control size may be much larger than in single or individual control channels. For example, in a 20 MHz system, the size of DCI format 0 for M=1 is approximately 44 bits. For M>1, the size can be much larger than 44 bits, e.g., if M=4, the size can be on the order of 100 bits or larger. As a result, a new set of aggregation levels may be beneficial with the larger control size. Currently, individual control channels may use aggregation levels of 1/2/4/8. In consideration of the potential larger control size with joint control channels, new aggregation levels of 4/8/16/32 may be used. The set may further be a function of M value, which means that the particular aggregation level or set of aggregation levels used or available may be selected based on the number of scheduled or potentially scheduled M uplink subframes. Correspondingly, the resource set size for EPDCCH may also be a function of M as well. For example, a UE may be configured with two instances of EPDCCH resource sets, where for M=1 or 2, the first instance is used and for M=3 or 4, the second instance is used.

Under current standards for DCI formats 0 and 1A, there is size-matching between the uplink and downlink control transmissions. Thus, for M=1, DCI format 0 and 1A have the same size for uplink and downlink DCI. However, when M>1 and if there is no joint control for downlink, there is no longer a need for size-matching joint control of uplink DCI with downlink DCI.

At block 1103, the base station transmits the joint control channel over the one or more selected downlink subframes.

Referring to FIG. 11B, on the UE side, at block 1104, the UE receives the joint control channel for variable TTI transmission over multiple uplink subframes, and at block 1105 transmits the variable TTI transmissions over the multiple uplink subframes according to the joint control channel. A UE that may be configured according to various aspects of the present disclosure may include UE 120 (FIG. 5), with its components and memory for storing various logic to execute or control the features described herein.

The underlying design of the joint control channel, for a given frame structure, may provide for the joint control channel to be configured either cell-specific or UE-specific. With a cell-specific configuration, all UEs of a given cell monitor the same subframe(s) for potential uplink grants scheduling a same set of uplink subframes. The cell-specific joint control channel configuration allows for simpler eNB scheduling. However, the control load in certain downlink subframes may be much higher than other downlink subframes, because the control for all UEs may be in a given downlink subframe. In order to address this increased size in certain subframes, different control sizes may be considered, e.g., larger control region in subframe(s) where uplink grants can be transmitted. In UE-specific configurations, each UE of the given cell may monitor different downlink subframes for potential uplink grants scheduling a same set of uplink subframes for variable TTI transmission. A UE-specific configuration allows for better control load balancing across subframes. However, increased eNB scheduling complexity may result.

In addition to the joint control channel, further aspects of the present disclosure may include an additional individual control in subframes subsequent to the subframe(s) carrying the joint control channel. These individual control channels may include instructions that override the uplink scheduling from the joint control. For example, the joint control channel may be transmitted in subframe n-4 and an individual control channel may be transmitted in subframe n-3, for uplink transmissions scheduled for subframe n+1. A UE will follow the instructions contained in the individual control channel, in subframe n-3, for the corresponding uplink transmissions, instead of relying on the joint control in subframe n-4. Because this individual control channel modifies the instructions and grants from the joint control channel, if the UE fails to successfully receive the joint control channel, then the UE may be configured with some options for handling this inconsistency. In a first alternative, the UE may treat receiving an individual control channel without a previous joint control channel as an error event. In a second alternative, the UE will start uplink transmissions beginning at the first uplink subframe even if there has been no uplink grant, as long as a CCA clears. This uplink transmission may be any various types of uplink communications, such as a channel use beacon signal (CUBS).

In the various aspects described herein, the features provide for separate transport blocks (TB) to be transmitted over different subframes in the variable TTI transmission. However, additional aspects of the present disclosure may also consider transmitting the same TB over all of the different scheduled uplink subframes, referred to as a bundled TTI transmission. If supported, the expected number of TTIs may be fixed for a given frame structure. The TTI bundling size is generally a function of frame structure. If TTI bundling is used, the bundling may be performed on a per frame basis (no cross-frame bundling) because CCA clearance is not guaranteed across frames. Transmission of a TB spanning two or more subframes helps combat interference, especially from hidden nodes, which may be an attribute of some WiFi nodes. It should be noted that, if supported, bundled TTI transmission may be performed for control, data, or both. The indication of bundled TTI transmission may be made via the control channel in a dynamic manner. Alternatively, the indication may be via a layer 3 configuration in a semi-static manner, and, as a result, upon receiving the control channel, the UE may determine that bundled TTI transmission should be performed.

With the special considerations of the variable TTI transmissions over unlicensed carriers, various changes may be made to certain uplink signals, such as PUSCH. FIGS. 12A and 12B are functional block diagrams illustrating example blocks executed to implement one aspect of the present disclosure. At block 1200, a base station prepares control information indicating a transmission grant to one or more UEs for variable TTI transmission over a plurality of uplink subframes. PUSCH parameters may be provided by a base station to a UE through the DCI signal. For example, considering the adjustments in the joint control channel for variable TTI transmissions, the cross carrier indicator may be provided as common to all of the subframes scheduled for the variable TTI transmission. With resource allocation, the allocation may be either common to or different across the scheduled subframes. In particular, it may be possible to have larger sizes scheduled in later subframes rather than the earlier subframes. Subframe hopping may also be considered.

Additional PUSCH parameters including MCS and RV may be different for different subframes. Similarly, the new data indicator (NDI) may also be different for different subframes. For example, within the scheduled M subframes, it may be possible to have certain subframes with new uplink transmissions, while other subframes may have re-transmissions. The transmission power control (TPC) command may be a single command or multiple commands for each of the scheduled subframes. When configured as multiple commands, the different power commands may have the same or separate application timing (e.g., timing may be dependent on the association of the power control commands with the corresponding uplink subframes in the bundle). Additionally, the phase information, including cyclic shift and orthogonal cover code (OCC) may be either the same or different across the scheduled M subframes. The downlink assignment index (DAI) may still include a single DAI. For a channel quality indicator (CQI) request, the request information may include a single request to transmit in the first uplink subframe, or the request may include transmissions over all scheduled subframes. Alternatively, the CQI request may be provided as an individual request for each of the M subframes. The sounding reference signal (SRS) requests may be configured similarly to the CQI requests. The SRS request may include a single request to transmit in the first uplink subframe, over all scheduled subframes, or individual requests for each of the M subframes. However, if an SRS is not transmitted in an uplink subframe, the UE would transmit PUSCH or PUCCH over the entire duration of the subframe in order to comply with the CCA procedures.

At block 1201, the base station transmits the control information to the one or more UEs.

Referring to FIG. 12B, on the UE side, at block 1202, the UE receives the control information indicating a transmission grant from a base station for variable TTI transmission over a plurality of uplink subframes. The UE, at block 1203, prepares for the variable TTI transmission using the control information. As indicated herein, the various PUSCH parameter prepared by the base station and sent along with the downlink control information are then used by the UE in assembling and preparing the actual PUSCH transmission. At block 1204, the UE then transmits the variable TTI transmissions over the plurality of uplink subframes according to the control information.

Figure 13:
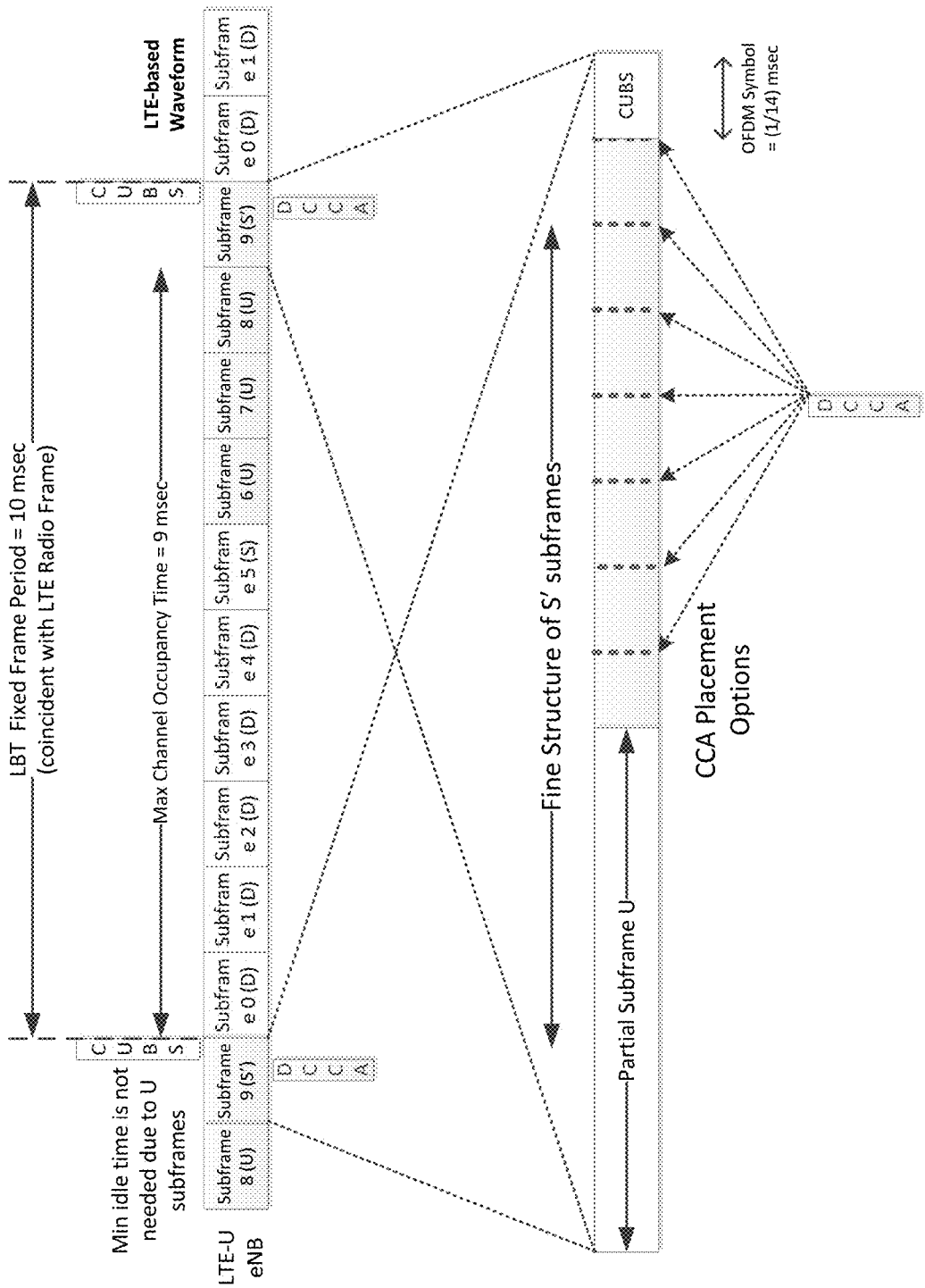
FIG. 13 illustrates example downlink subframe structure for operating in carrier aggregation (CA) mode or stand-alone (SA) mode.

For the CA and SA modes, an example downlink frame structure is provided in FIG. 13. For example, LBT in the downlink may be achieved through a partial uplink (S') subframe to schedule succeeding downlink subframes. In the example, of FIG. 13, the number of slots for CCA placement may be referred to as CCA reuse factor, which is 7 in FIG. 13. A cell-specific (or common) reference signal (CRS) may be provided every $5^{th}$ subframe. The waveform used for transmission of the subframes may be based on a UE reference signal (UEFS) based demodulation.

Figure 14:
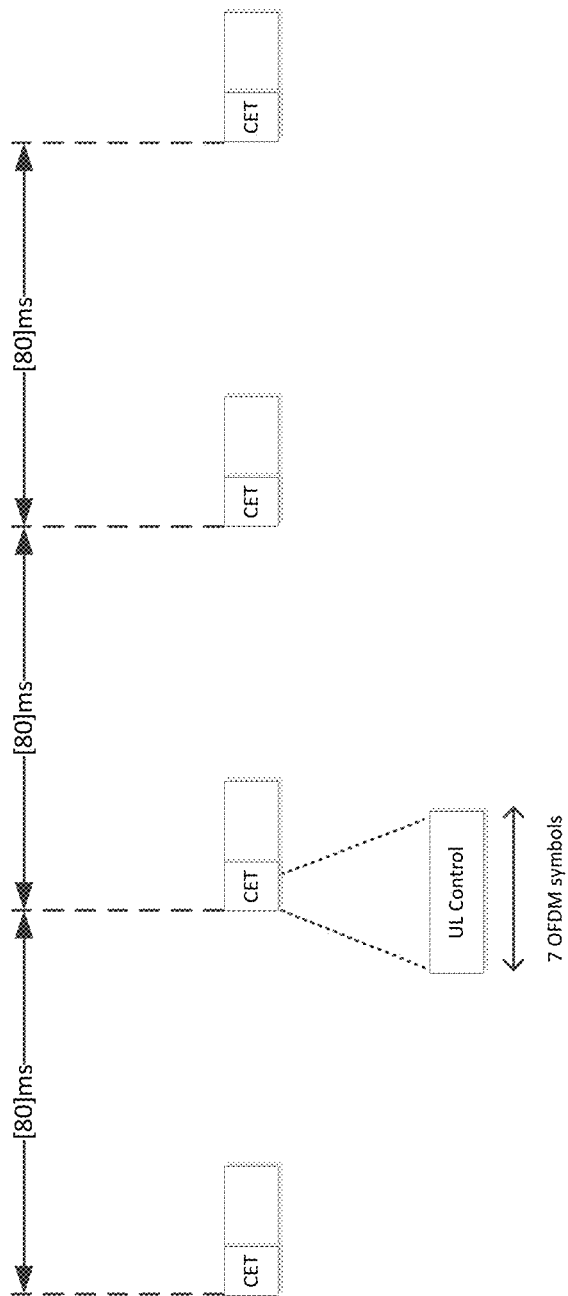
FIG. 14 illustrates example uplink subframe structure for periodic transmissions of CETs.

FIG. 14 illustrates an example uplink frame structure. For example, Periodic transmission may be used to control the frames. CETs (SRS/PRACH/CSI/SR) may have periodicity such as 80 ms with duty cycle<5%. In the example of FIG. 14, one slot may be used for transmission with 7 slot reuse such that overhead=3.5/80=4.4%.

Referring again to FIG. 9, which illustrates CA and SA mode uplink frame structure. LBT in uplink may be performed using a special (S) subframe, which is prior to the uplink (U) subframe. This may allow the uplink (U) subframe to be scheduled. Uplink CCA (UCCA) may be based on a reuse factor. In the example of FIG. 9, the reuse factor may be 7. UEs from the same PLMN may perform CCA simultaneously. The CUBS may be used to indicate channel usage. Variable TTI may be achieved in the uplink. Uplink symbols may be used by scheduled UEs. The Waveform may be based on RB-interleaved SC-FDM.

Referring again to FIG. 10, which illustrates an example UL subframe structure with variable TTI. The variable-TTI may include continuous transmission in the uplink to meet LBT regulations of continuous transmission after CCA.

There may be UL regulatory constraints beyond LBT. For example, one constraint may include dynamic frequency selection (DFS). DFS may be mandatory for a master node (eNB) under European Union (EU) rules. The UE may not have to perform DFS subject to lower power. For example, there may be a total low transmit power of 23 dBm. There may be a low power spectral density (PSD) of 10 dBm/MHz with 1 MHz resolution bandwidth (RBW).

There may be occupied bandwidth regulation in some EU bands. The occupied channel bandwidth may be defined by a frequency sweep of 0.5% energy to 99.5% energy. For example, the occupied channel bandwidth may be ≥0.80× Nominal BW, most of the time. Effectively a SPAN of 80% nominal bandwidth may be required. SC-FDMA based signal may not meet this requirement in many cases. Changes to the UL transmission may be needed.

Referring again to FIG. 8, illustrating an example UL waveform, which may be a set of resource blocks interleaved in a bandwidth.

The physical uplink shared channel (PUSCH) may be allocated based on a multi-cluster SC-FDMA. There may be RB level interleaving with a minimum granularity of 10 RBs to meet 80% occupancy. Up to 10 PUSCH channels may be multiplexed in a 20 MHz system. This may be shortened in the S' subframe.

SRS/U-CUBS may use wideband transmission (96 RB). In one option, the SRS/U-CUBS may be interlaced like PUSCH. In a second option, the SRS/U-CUBS may be the full bandwidth, in a wideband configuration. The signals may be transmitted in the S subframe after CCA. This may be repeated until the start of the U subframe. There may be partition of sequences for L2/L3 SRS transmission and other UL transmissions (1 by default). The configuration may guarantee SRS in the CET subframe is transmitted at the last symbol of the slot.

Some UL channels may only be applicable to SA or Multi Flow. For the PUCCH, RB level interleaving may be used, as for PUSCH. 1 interlace may be used by default (10 RBs). UE CDM multiplexing may be used over each RB.

For the PRACH, RB level interleaving may be used, as for PUSCH. 1 interlace may be used by default (10 RBs). CCA-exempt transmission of PRACH may suggest the first 6 symbols are included in the CET slot.

There may be advantages over TDM such as CCA overhead is too much for symbol level TDM leading to link budget loss. An advantage over narrow band mirror hopping may be PSD cap leads to link budget loss. However, there may be a risk to meeting new tighter regulation.

Optimization of the designs described herein may include PUCCH/PUSCH optimization for small payloads. Narrow band mirror hopping may be used to meet the 80% occupancy requirements.

Alternative waveforms may be used. For the case of PUCCH+PUSCH transmission on the same subframe, no change may be needed because the configured may already be wideband. For the case of no PUCCH scheduled, padding RB(s) are added on the edge of channel bandwidth, or Padding RB(s) could provide carrier rate indication/DM-RS or other information, or Padding RB(s) could be multiplexed with a large number of UEs.

An advantage of the alternative waveforms may include higher multiplexing order, with less scheduling restriction.

One drawback, however, may include a risk of failing more stringent interpretation of the regulatory requirements.

Another example waveform is as follows. The PUSCH PHY optimization may be based on OFDM. An advantage may include better link efficiency. A drawback may include less power amplifier (PA) efficiency, but this won't be much worse since baseline of interleaved RB is already high peak to average power ratio (PAPR). Also, it may be less likely to be accepted.

FIGS. 15-16, and 17-19 are tables showing alternative waveform options. FIG. 15 is a table showing an example configuration using a narrow band waveform with mirror hopping and a multi-cluster configuration. FIG. 16 is another table showing an example configuration using a waveform combing TDM and FDM.

Figure 17:
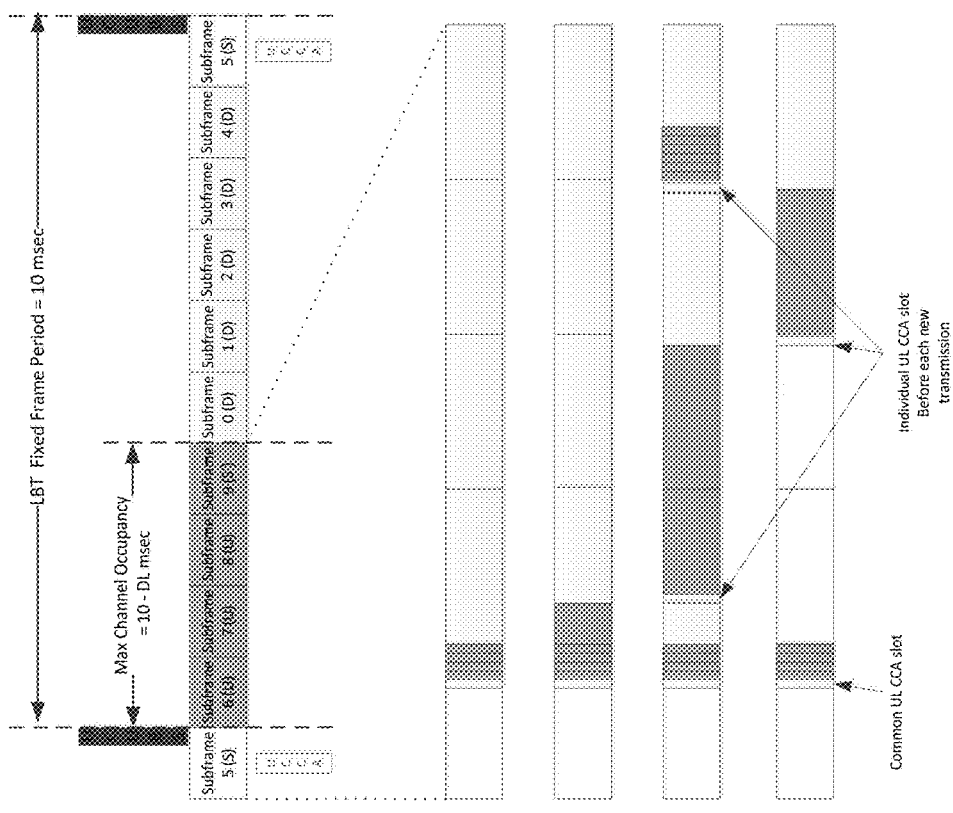
FIG. 17 illustrates example subframe structure for TDM CCA.

FIG. 17 illustrates an example subframe structure for TDM CCA. The TDM CCA may provide an alternative to variable TTI and FDM between UEs. UEs from the same group may perform CCA at the same location. If a UE discontinues the transmission, the UE may perform CCA before a new transmission. Channels may be structured to have CCA opportunities between transmission bursts. There may be a minimum of 1 OFDM symbol. 1 CCA may likely be needed because no reuse may be needed.

FIG. 18 is another table showing an example configuration using an FDM waveform. FIG. 19 is another table showing an example configuration using a CDM waveform.

Figure 20:
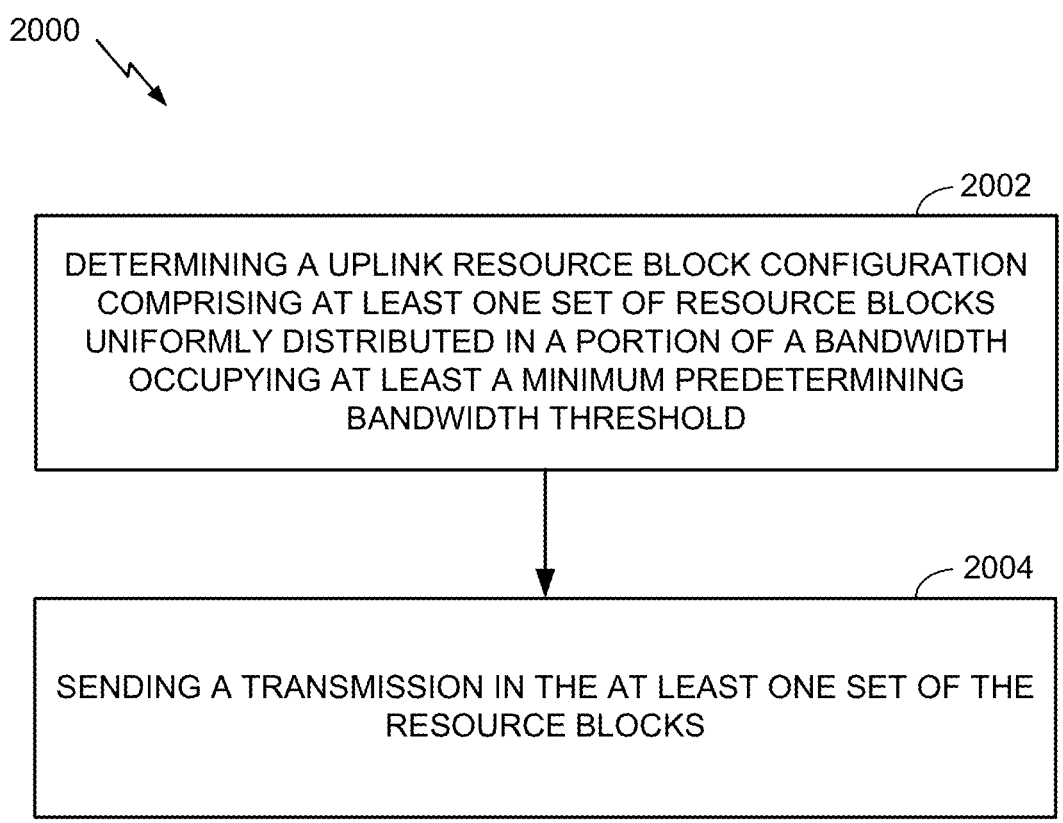
FIG. 20 illustrates aspects of a methodology for communication in LTE-U using an uplink waveform.

FIG. 20 illustrates embodiments of methodologies for transmissions using LTE waveforms. The method may be performed by a UE, mobile entity, or the like. The method 2000 may include, at 2002, determining an uplink resource block configuration comprising at least one set of resource blocks uniformly distributed in a portion of a bandwidth occupying at least a minimum predetermined bandwidth threshold. The method may include, at 2004, sending a transmission in the at least one set of the resource blocks.

Figure 21:
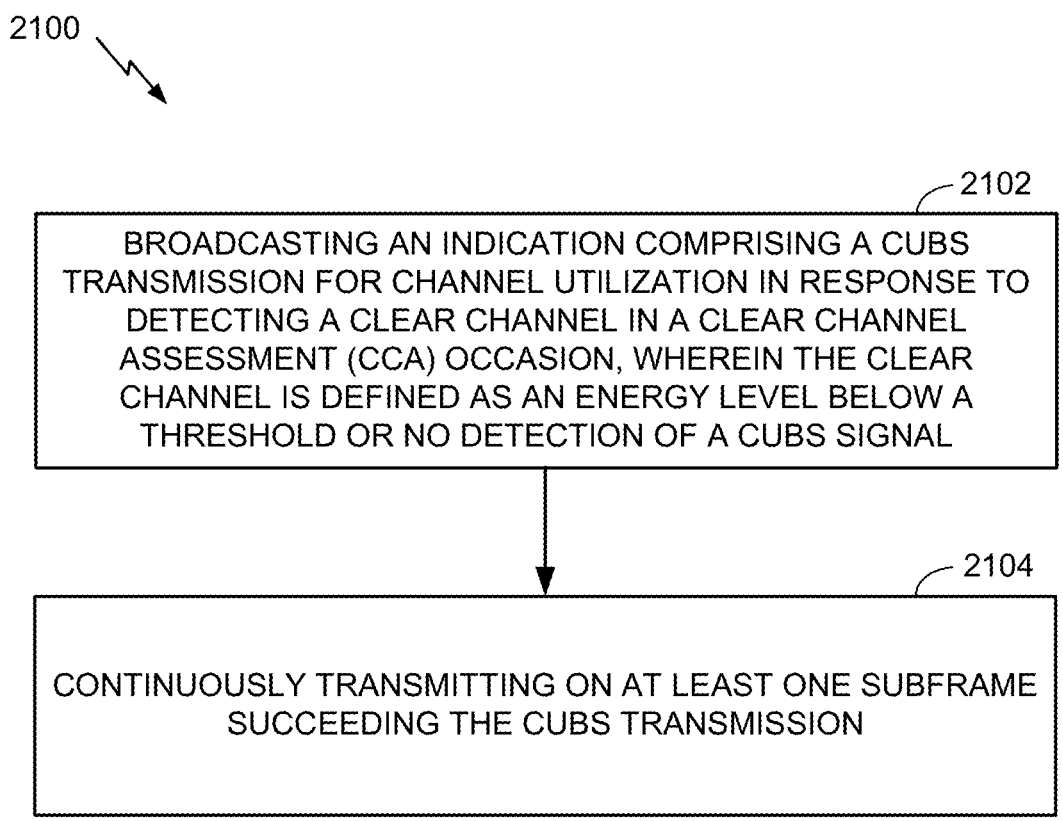
FIG. 21 illustrates aspects of a methodology for communication in LTE-U using an uplink waveform.

FIG. 21 illustrates embodiments of methodologies for transmissions using LTE waveforms. The method may be performed by a UE, mobile entity, or the like. The method 2100 may include, at 2102, broadcasting an indication comprising a CUBS transmission for channel utilization in response to detecting a clear channel in a clear channel assessment (CCA) occasion, wherein the clear channel is defined as an energy level below a threshold or no detection of a CUBS signal. The method may include, at 2104, continuously transmitting on at least one subframe succeeding the CUBS transmission.

Figure 22:
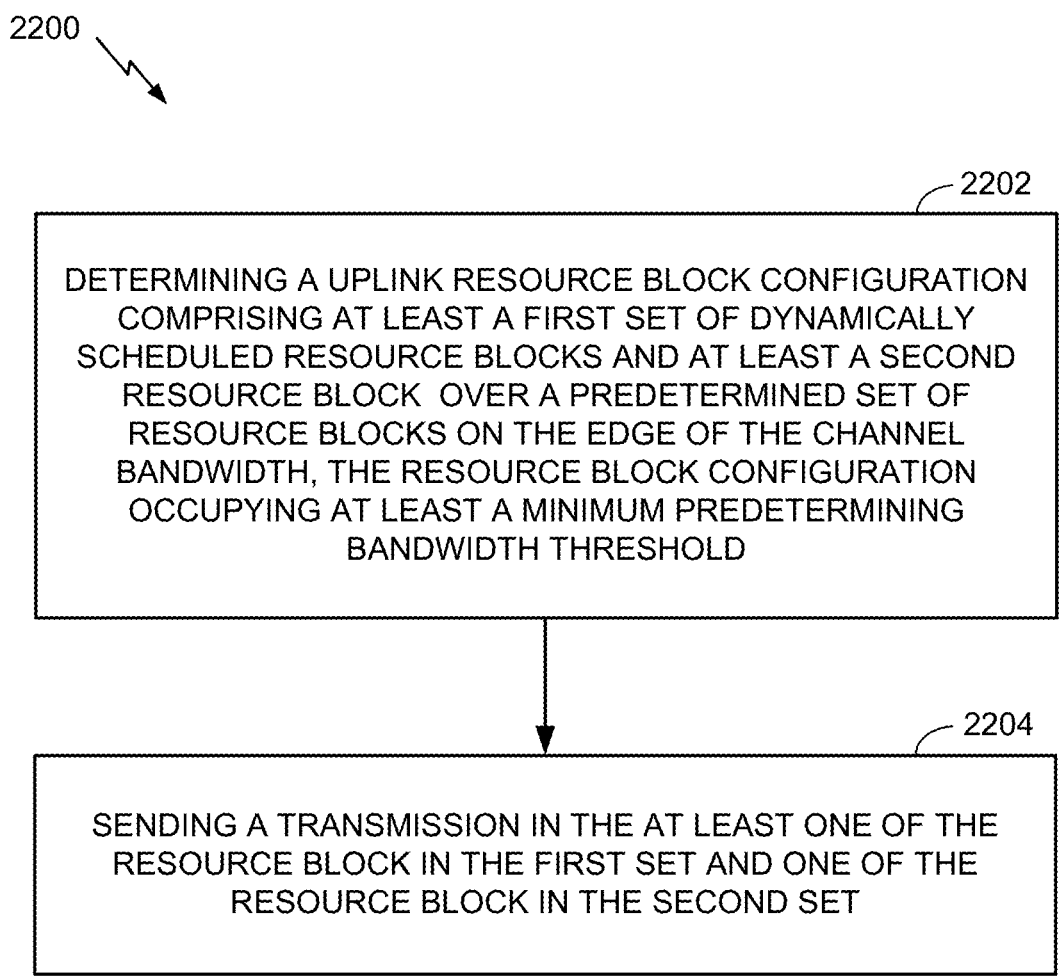
FIG. 22 illustrates aspects of a methodology for communication in LTE-U using an uplink waveform.

FIG. 22 illustrates embodiments of methodologies for transmissions using LTE waveforms. The method may be performed by a UE, mobile entity, or the like. The method 2200 may include, at 2202, determining an uplink resource block configuration comprising at least a first set of dynamically scheduled resource blocks and at least a second resource block over a predetermined set of resource blocks on the edge of the channel bandwidth, the resource block configuration occupying at least a minimum predetermined bandwidth threshold. The method may include, at 2204, sending a transmission in the at least one of the resource block in the first set and one of the resource block in the second set.

Figure 23:
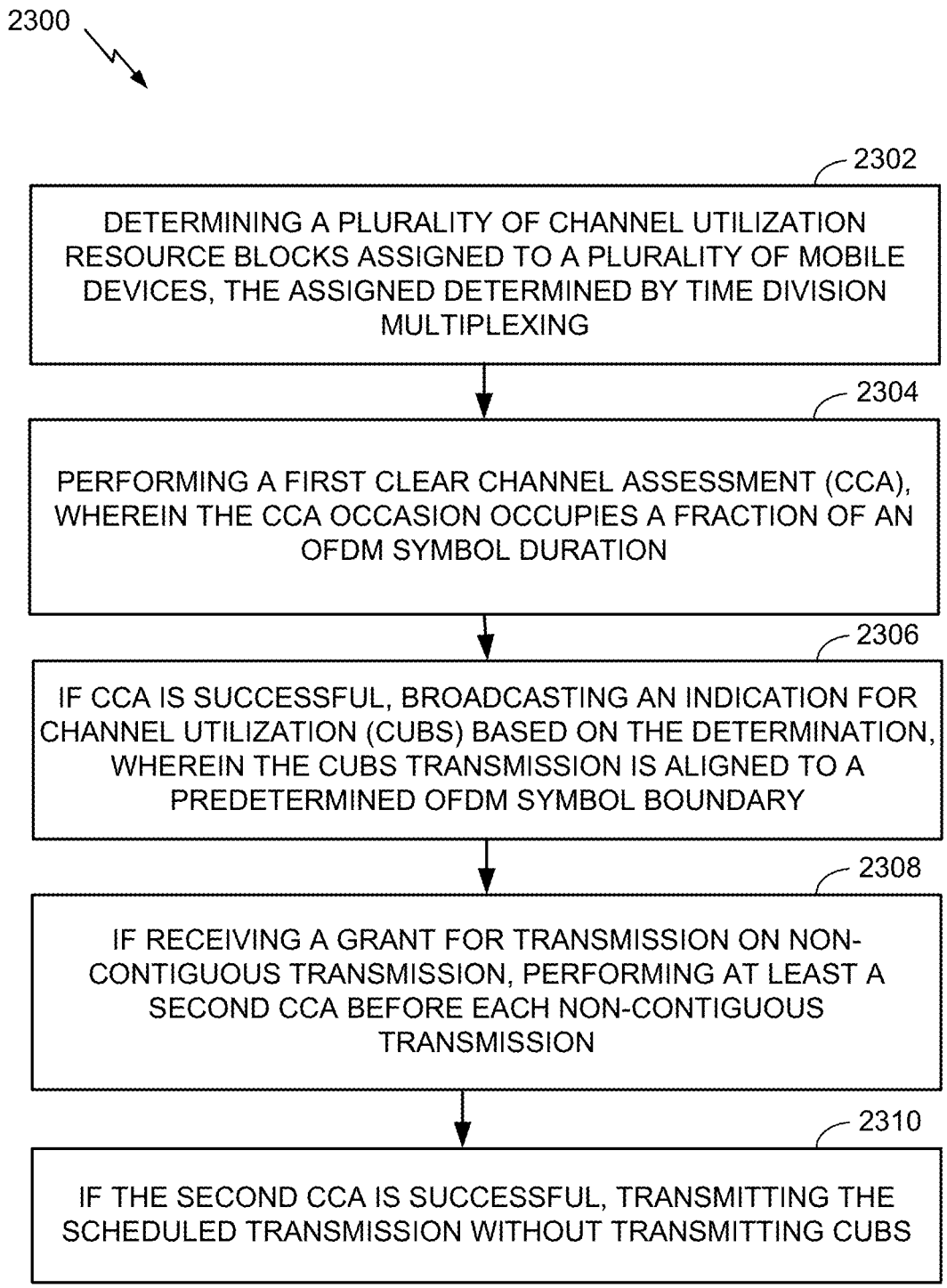
FIG. 23 illustrates aspects of a methodology for communication in LTE-U using an uplink waveform.

FIG. 23 illustrates embodiments of methodologies for transmissions using LTE waveforms. The method may be performed by a UE, mobile entity, or the like. The method 2300 may include, at 2302, determining a plurality of channel utilization resource blocks assigned to a plurality of mobile devices, the assigned determined by time division multiplexing. The method may include, at 2304, performing a first clear channel assessment (CCA), wherein the CCA occasion occupies a fraction of an OFDM symbol duration. The method may include, at 2306, if CCA is successful, broadcasting an indication for channel utilization (CUBS) based on the determination, wherein the CUBS transmission is aligned to a predetermined OFDM symbol boundary. The method may include, at 2308, if receiving a grant for transmission on non-contiguous transmission, performing at least a second CCA before each non-contiguous transmission. The method may include, at 2310, if the second CCA is successful, transmitting the scheduled transmission without transmitting CUBS.

Figure 24:
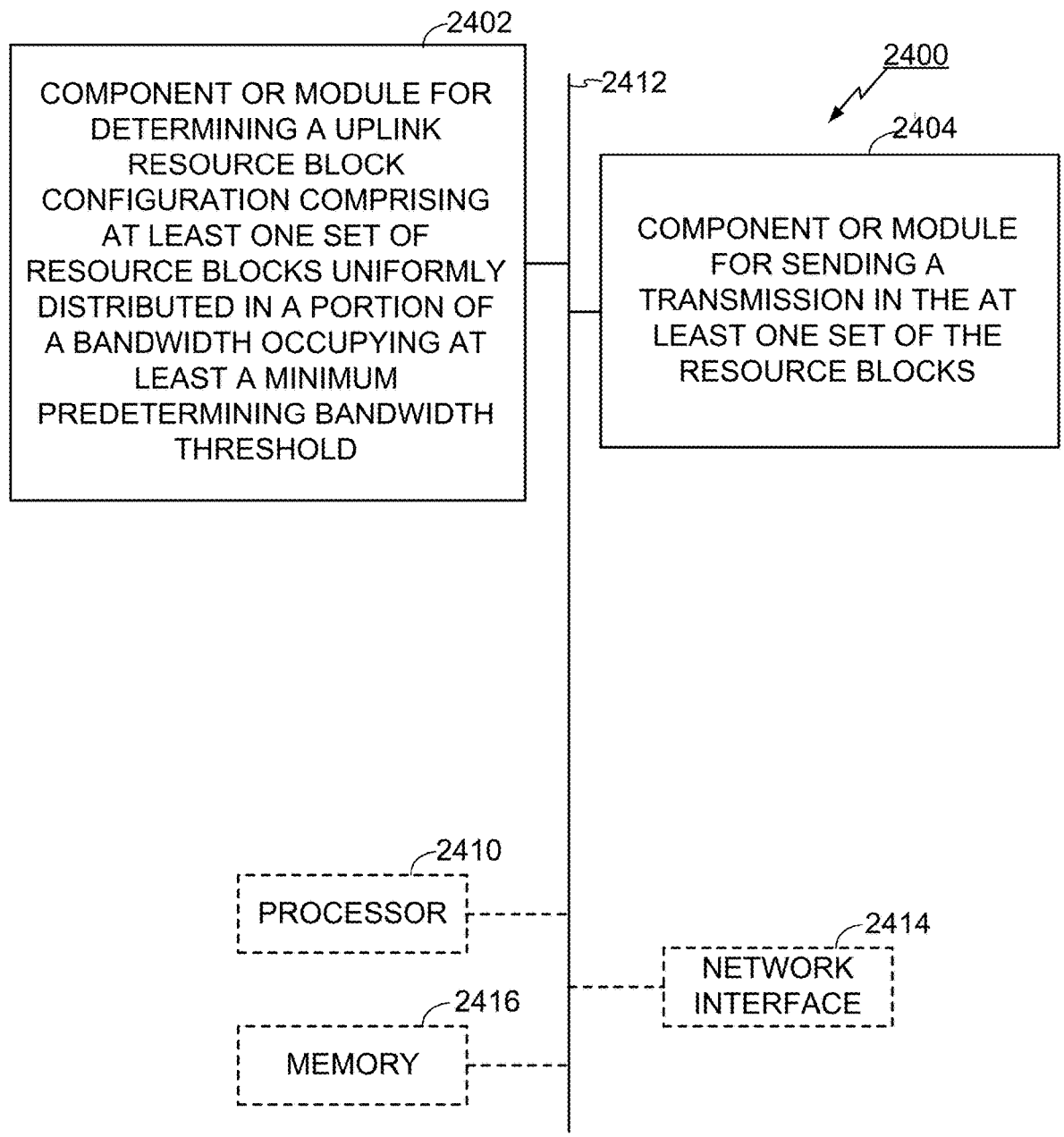
FIG. 24 illustrates an example apparatus for implementing a methodology according to FIG. 20.

With reference to FIG. 24, there is provided an exemplary apparatus 2400 that may be configured as a UE, network entity, or other suitable entity, or as a processor, component or similar device for use within the UE, network entity, or other suitable entity, for network node selection. The apparatus 2400 may include functional blocks that can represent functions implemented by a processor, software, or combination thereof (e.g., firmware).

As illustrated, in one embodiment, the apparatus 2400 may include an electrical component or module 2402 for determining a uplink resource block configuration comprising at least one set of resource blocks uniformly distributed in a portion of a bandwidth occupying at least a minimum predetermined bandwidth threshold. The apparatus 2400 may include an electrical component or module 2404 for sending a transmission in the at least one set of the resource blocks.

In related aspects, the apparatus 2400 may optionally include a processor component 2410 having at least one processor, in the case of the apparatus 2400 configured as a network entity. The processor 2400, in such case, may be in operative communication with the components 2402-2404 or similar components via a bus 2412 or similar communication coupling. The processor 2410 may effect initiation and scheduling of the processes or functions performed by electrical components or modules 2402-2404.

In further related aspects, the apparatus 2400 may include a network interface component 2414 for communicating with other network entities. The apparatus 2400 may optionally include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for performing the activity of the components 2402-2404, and subcomponents thereof, or the processor 2410. The memory component 2416 may retain instructions for executing functions associated with the components 2402-2404. While shown as being external to the memory 2416, it is to be understood that the components 2402-2404 can exist within the memory 2416.

Figure 25:
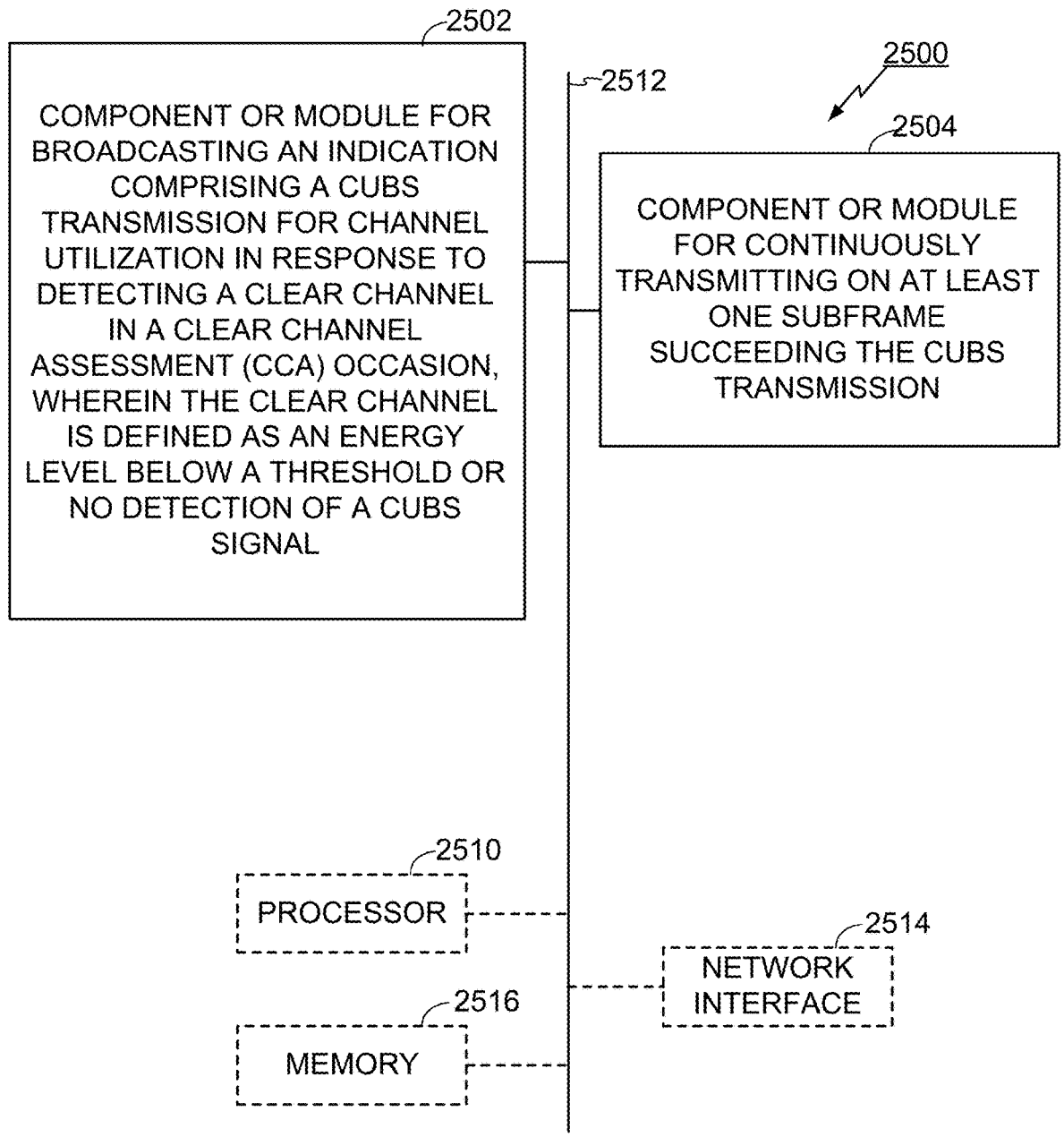
FIG. 25 illustrates an example apparatus for implementing a methodology according to FIG. 21.

With reference to FIG. 25, there is provided an exemplary apparatus 2500 that may be configured as a UE, network entity, or other suitable entity, or as a processor, component or similar device for use within the UE, network entity, or other suitable entity, for network node selection. The apparatus 2500 may include functional blocks that can represent functions implemented by a processor, software, or combination thereof (e.g., firmware).

As illustrated, in one embodiment, the apparatus 2500 may include an electrical component or module 2502 for broadcasting an indication comprising a CUBS transmission for channel utilization in response to detecting a clear channel in a clear channel assessment (CCA) occasion, wherein the clear channel is defined as an energy level below a threshold or no detection of a CUBS signal. The apparatus 2500 may include an electrical component or module 2504 for continuously transmitting on at least one subframe succeeding the CUBS transmission.

In related aspects, the apparatus 2500 may optionally include a processor component 2510 having at least one processor, in the case of the apparatus 2500 configured as a network entity. The processor 2510, in such case, may be in operative communication with the components 2502-2504 or similar components via a bus 2512 or similar communication coupling. The processor 2510 may effect initiation and scheduling of the processes or functions performed by electrical components or modules 2502-2504.

In further related aspects, the apparatus 2500 may include a network interface component 2514 for communicating with other network entities. The apparatus 2500 may optionally include a component for storing information, such as, for example, a memory device/component 2516. The computer readable medium or the memory component 2516 may be operatively coupled to the other components of the apparatus 2500 via the bus 2512 or the like. The memory component 2516 may be adapted to store computer readable instructions and data for performing the activity of the components 2502-2504, and subcomponents thereof, or the processor 2510. The memory component 2516 may retain instructions for executing functions associated with the components 2502-2504. While shown as being external to the memory 2516, it is to be understood that the components 2502-2504 can exist within the memory 2516.

Figure 26:
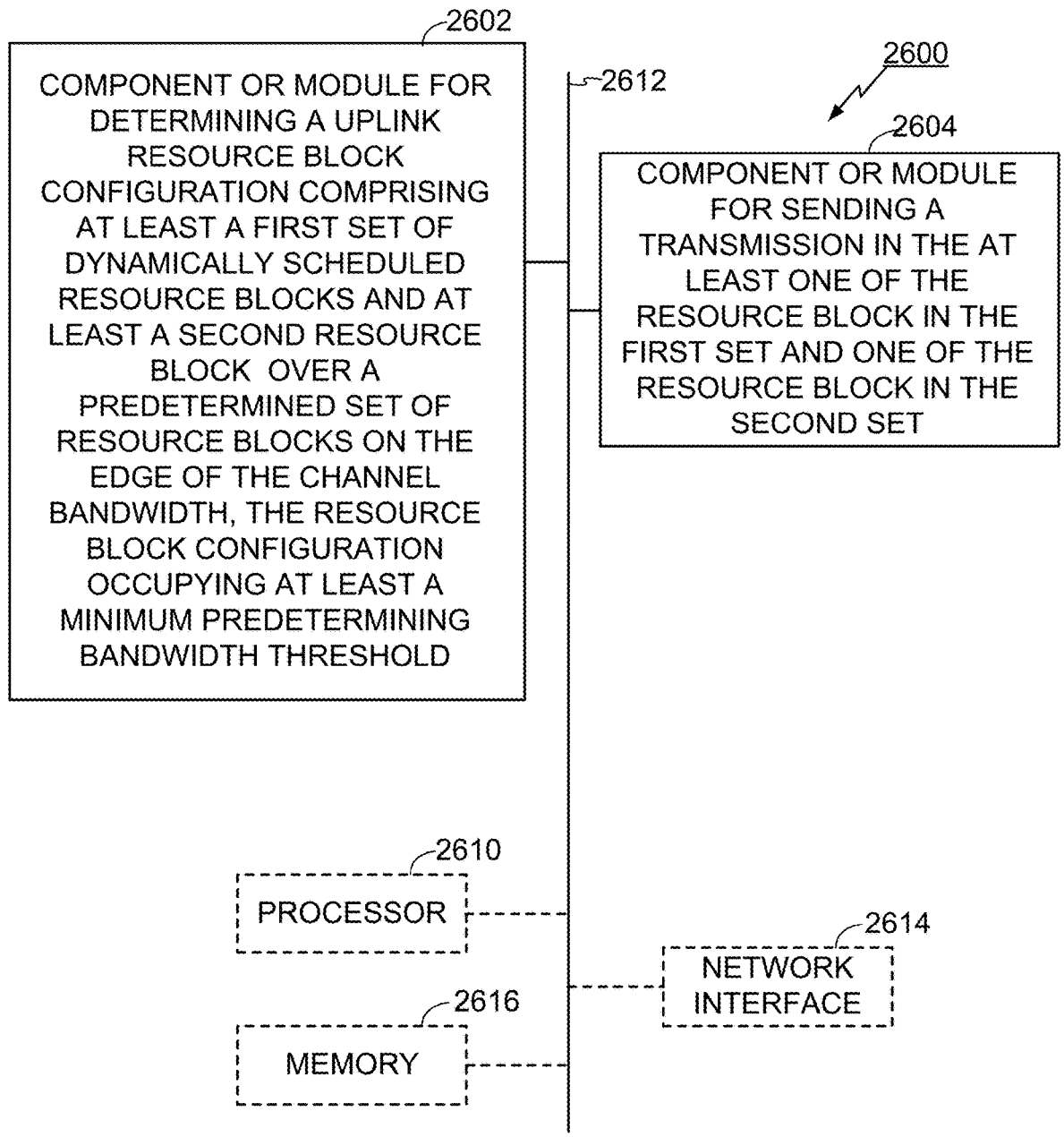
FIG. 26 illustrates an example apparatus for implementing a methodology according to FIG. 22.

With reference to FIG. 26, there is provided an exemplary apparatus 2600 that may be configured as a UE, network entity, or other suitable entity, or as a processor, component or similar device for use within the UE, network entity, or other suitable entity, for network node selection. The apparatus 2600 may include functional blocks that can represent functions implemented by a processor, software, or combination thereof (e.g., firmware).

As illustrated, in one embodiment, the apparatus 2600 may include an electrical component or module 2602 for determining a uplink resource block configuration comprising at least a first set of dynamically scheduled resource blocks and at least a second resource block over a predetermined set of resource blocks on the edge of the channel bandwidth, the resource block configuration occupying at least a minimum predetermined bandwidth threshold. The apparatus 2600 may include an electrical component or module 2604 for sending a transmission in the at least one of the resource block in the first set and one of the resource block in the second set.

In related aspects, the apparatus 2600 may optionally include a processor component 2610 having at least one processor, in the case of the apparatus 2600 configured as a network entity. The processor 2610, in such case, may be in operative communication with the components 2602-2604 or similar components via a bus 2612 or similar communication coupling. The processor 2610 may effect initiation and scheduling of the processes or functions performed by electrical components or modules 2602-2604.

In further related aspects, the apparatus 2600 may include a network interface component 2614 for communicating with other network entities. The apparatus 2600 may optionally include a component for storing information, such as, for example, a memory device/component 2616. The computer readable medium or the memory component 2616 may be operatively coupled to the other components of the apparatus 2600 via the bus 2612 or the like. The memory component 2616 may be adapted to store computer readable instructions and data for performing the activity of the components 2602-2604, and subcomponents thereof, or the processor 2610. The memory component 2616 may retain instructions for executing functions associated with the components 2602-2604. While shown as being external to the memory 2616, it is to be understood that the components 2602-2604 can exist within the memory 2616.

Figure 27:
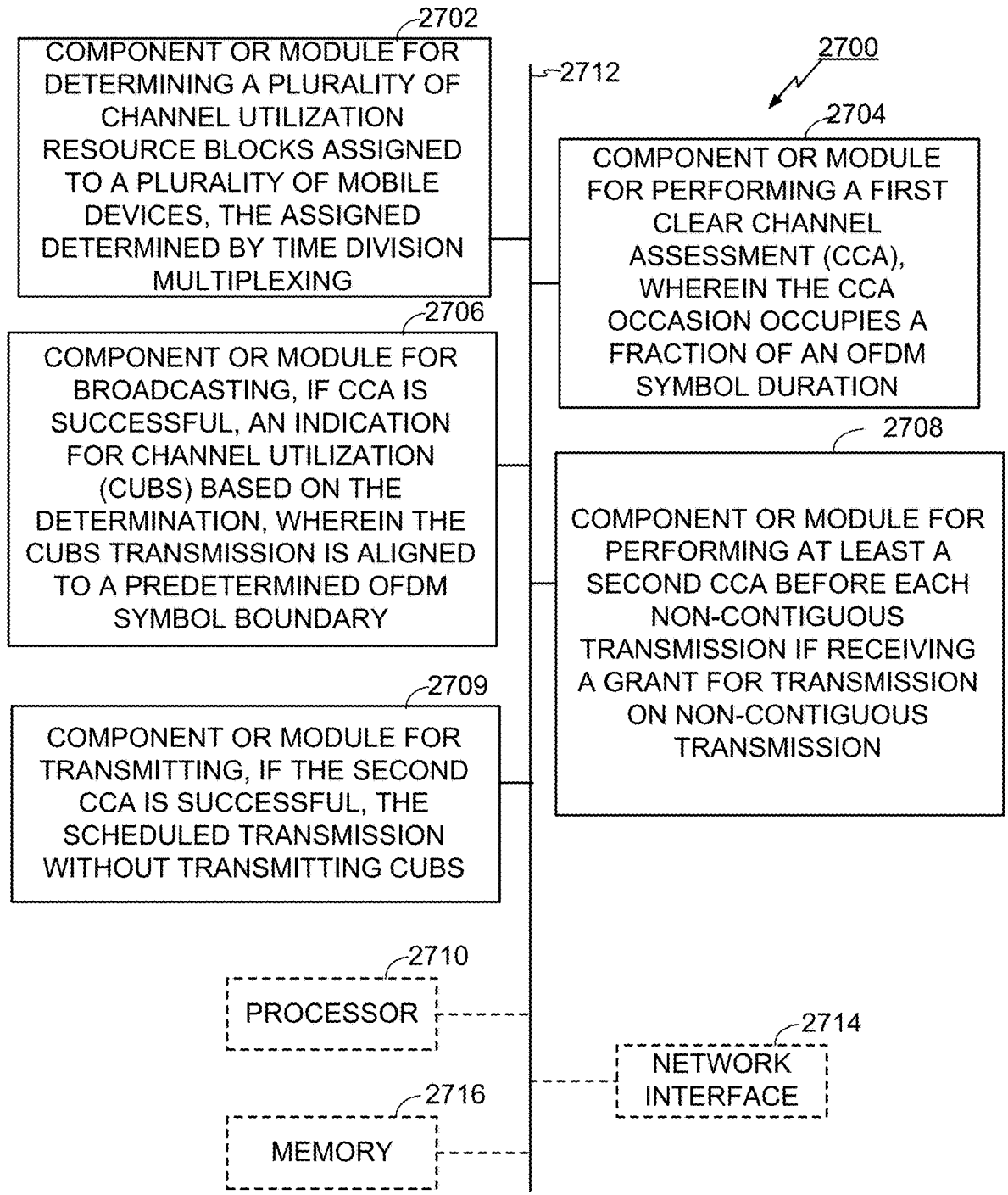
FIG. 27 illustrates an example apparatus for implementing a methodology according to FIG. 23.

With reference to FIG. 27, there is provided an exemplary apparatus 2700 that may be configured as a UE, network entity, or other suitable entity, or as a processor, component or similar device for use within the UE, network entity, or other suitable entity, for network node selection. The apparatus 2700 may include functional blocks that can represent functions implemented by a processor, software, or combination thereof (e.g., firmware).

As illustrated, in one embodiment, the apparatus 2700 may include an electrical component or module 2702 for determining a plurality of channel utilization resource blocks assigned to a plurality of mobile devices, the assigned determined by time division multiplexing. The apparatus 2700 may include an electrical component or module 2704 for performing a first clear channel assessment (CCA), wherein the CCA occasion occupies a fraction of an OFDM symbol duration. The apparatus 2700 may include an electrical component or module 2706 if CCA is successful, broadcasting an indication for channel utilization (CUBS) based on the determination, wherein the CUBS transmission is aligned to a predetermined OFDM symbol boundary. The apparatus 2700 may include an electrical component or module 2708 if receiving a grant for transmission on non-contiguous transmission, performing at least a second CCA before each non-contiguous transmission. The apparatus 2700 may include an electrical component or module 2709 transmitting, if the second CCA is successful, the scheduled transmission without transmitting CUBS.

In related aspects, the apparatus 2700 may optionally include a processor component 2710 having at least one processor, in the case of the apparatus 2700 configured as a network entity. The processor 2710, in such case, may be in operative communication with the components 2702-2709 or similar components via a bus 2712 or similar communication coupling. The processor 2710 may effect initiation and scheduling of the processes or functions performed by electrical components or modules 2702-2709.

In further related aspects, the apparatus 2700 may include a network interface component 2714 for communicating with other network entities. The apparatus 2700 may optionally include a component for storing information, such as, for example, a memory device/component 2716. The computer readable medium or the memory component 2716 may be operatively coupled to the other components of the apparatus 2700 via the bus 2712 or the like. The memory component 2716 may be adapted to store computer readable instructions and data for performing the activity of the components 2702-2709, and subcomponents thereof, or the processor 2710. The memory component 2716 may retain instructions for executing functions associated with the components 2702-2709. While shown as being external to the memory 2716, it is to be understood that the components 2702-2709 can exist within the memory 2716.

Figure 28:
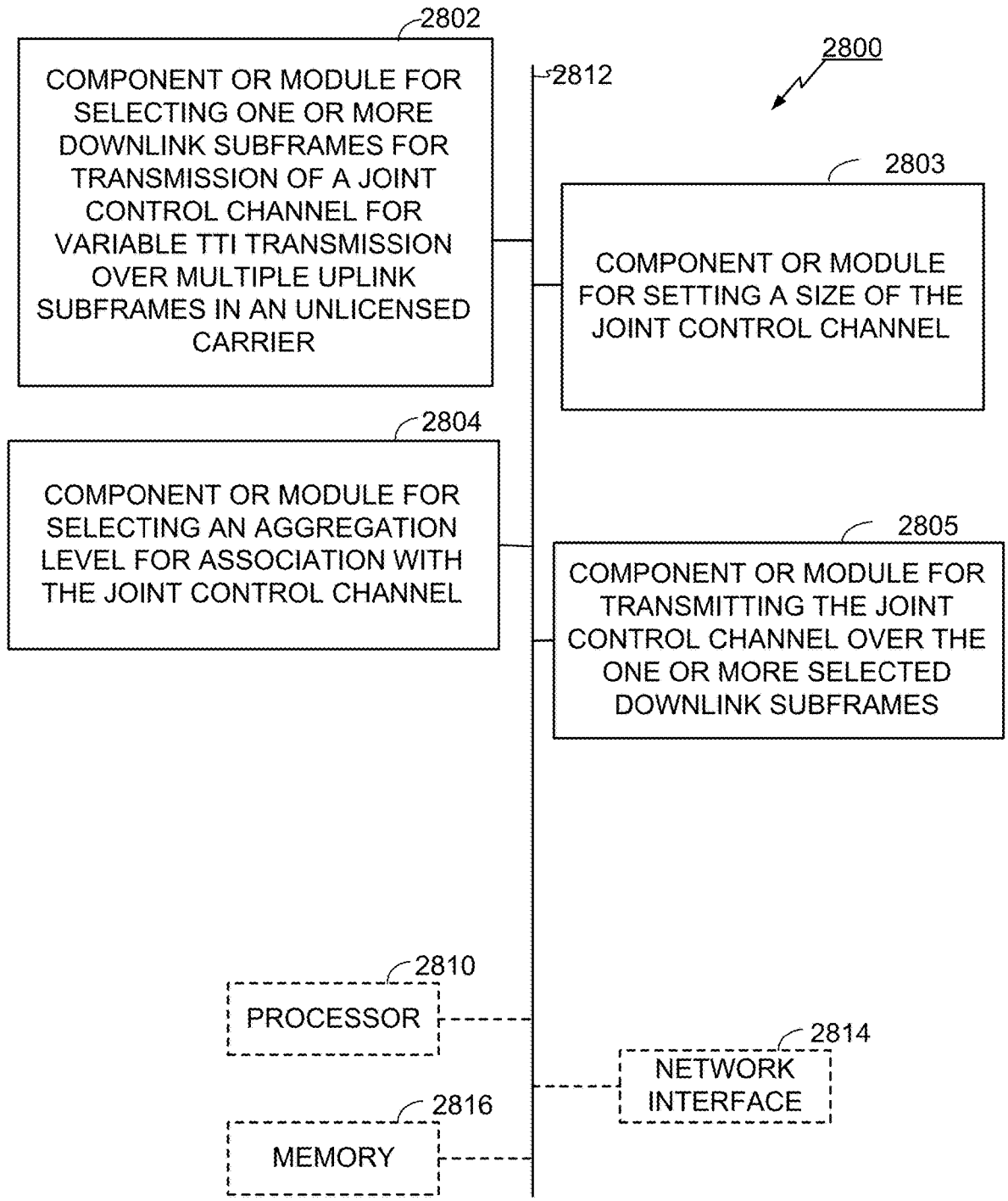
FIG. 28 illustrates an example apparatus for implementing a methodology according to FIG. 11A.

With reference to FIG. 28, there is provided an exemplary apparatus 2800 that may be configured as a base station, network entity, or other suitable entity, or as a processor, component or similar device for use within the base station, network entity, or other suitable entity. The apparatus 2800 may include functional blocks that can represent functions implemented by a processor, software, or combination thereof (e.g., firmware).

As illustrated, in one embodiment, the apparatus 2800 may include an electrical component or module 2802 for selecting one or more downlink subframes for transmission of a joint control channel for variable TTI transmission over multiple uplink subframes in an unlicensed carrier. The apparatus 2800 may include an electrical component or module 2803 for setting a size of the joint control channel. The apparatus 2800 may include an electrical component or module 2804 for selecting an aggregation level for association with the joint control channel. The apparatus 2800 may include an electrical component or module 2805 for transmitting the joint control channel over the one or more selected downlink subframes.

In related aspects, the apparatus 2800 may optionally include a processor component 2810 having at least one processor, in the case of the apparatus 2800 configured as a network entity. The processor 2810, in such case, may be in operative communication with the components 2802-2805 or similar components via a bus 2812 or similar communication coupling. The processor 2810 may effect initiation and scheduling of the processes or functions performed by electrical components or modules 2802-2805.

In further related aspects, the apparatus 2800 may include a network interface component 2814 for communicating with other network entities. The apparatus 2800 may optionally include a component for storing information, such as, for example, a memory device/component 2816. The computer readable medium or the memory component 2816 may be operatively coupled to the other components of the apparatus 2800 via the bus 2812 or the like. The memory component 2816 may be adapted to store computer readable instructions and data for performing the activity of the components 2802-2805, and subcomponents thereof, or the processor 2810. The memory component 2816 may retain instructions for executing functions associated with the components 2802-2805. While shown as being external to the memory 2816, it is to be understood that the components 2802-2805 can exist within the memory 2816.

Figure 29:
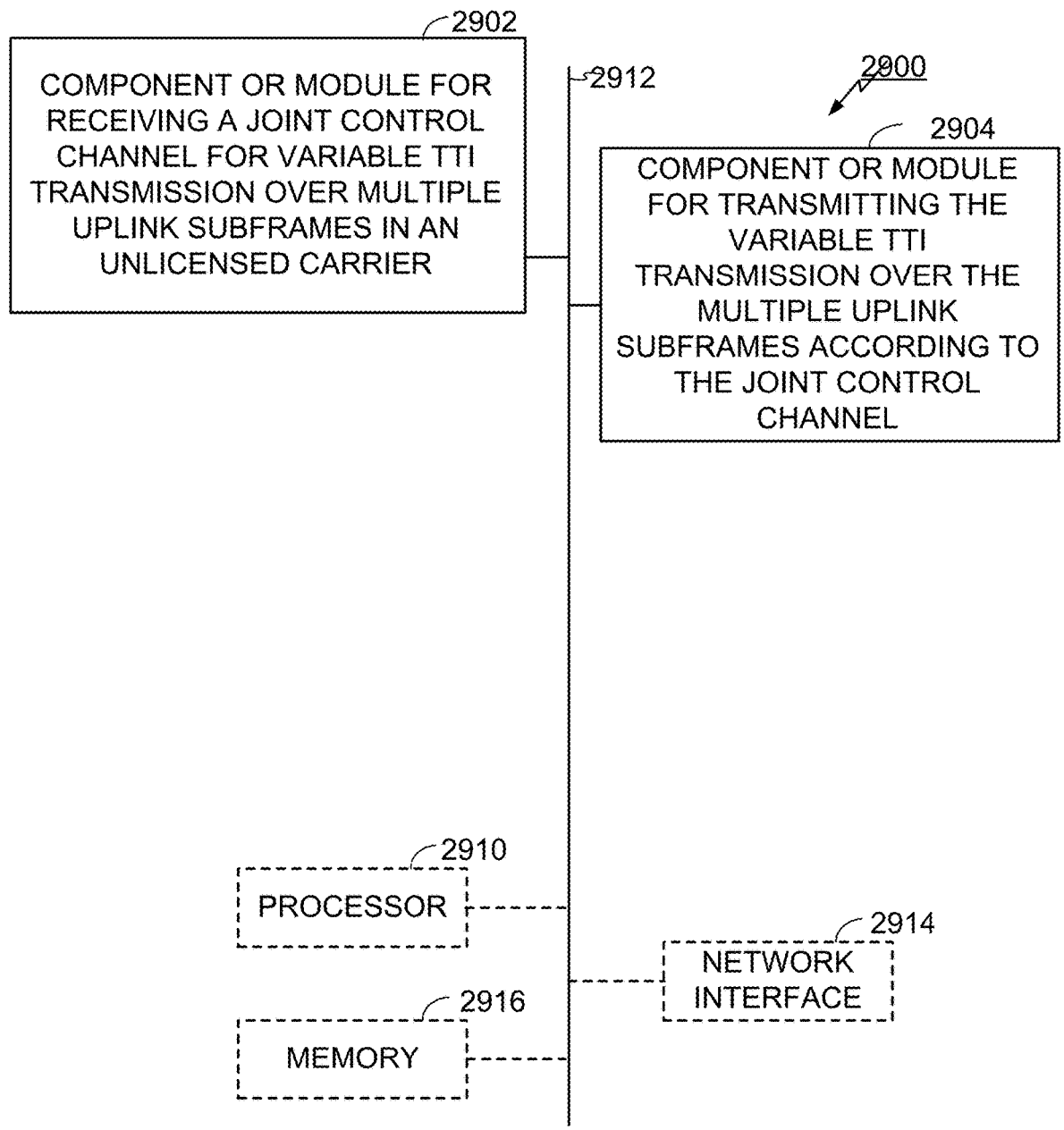
FIG. 29 illustrates an example apparatus for implementing a methodology according to FIG. 11B.

With reference to FIG. 29, there is provided an exemplary apparatus 2900 that may be configured as a UE, network entity, or other suitable entity, or as a processor, component or similar device for use within the UE, network entity, or other suitable entity, for network node selection. The apparatus 2900 may include functional blocks that can represent functions implemented by a processor, software, or combination thereof (e.g., firmware).

As illustrated, in one embodiment, the apparatus 2900 may include an electrical component or module 2902 for receiving a joint control channel for variable TTI transmission over multiple uplink subframes in an unlicensed carrier.

The apparatus 2900 may include an electrical component or module 2904 for transmitting the variable TTI transmission over the multiple uplink subframes according to the joint control channel.

In related aspects, the apparatus 2900 may optionally include a processor component 2910 having at least one processor, in the case of the apparatus 2900 configured as a network entity. The processor 2910, in such case, may be in operative communication with the components 2902-2904 or similar components via a bus 2912 or similar communication coupling. The processor 2910 may effect initiation and scheduling of the processes or functions performed by electrical components or modules 2902-2904.

In further related aspects, the apparatus 2900 may include a network interface component 2914 for communicating with other network entities. The apparatus 2900 may optionally include a component for storing information, such as, for example, a memory device/component 2916. The computer readable medium or the memory component 2916 may be operatively coupled to the other components of the apparatus 2900 via the bus 2912 or the like. The memory component 2916 may be adapted to store computer readable instructions and data for performing the activity of the components 2902-2904, and subcomponents thereof, or the processor 2910. The memory component 2916 may retain instructions for executing functions associated with the components 2902-2904. While shown as being external to the memory 2916, it is to be understood that the components 2902-2904 can exist within the memory 2916.

Figure 30:
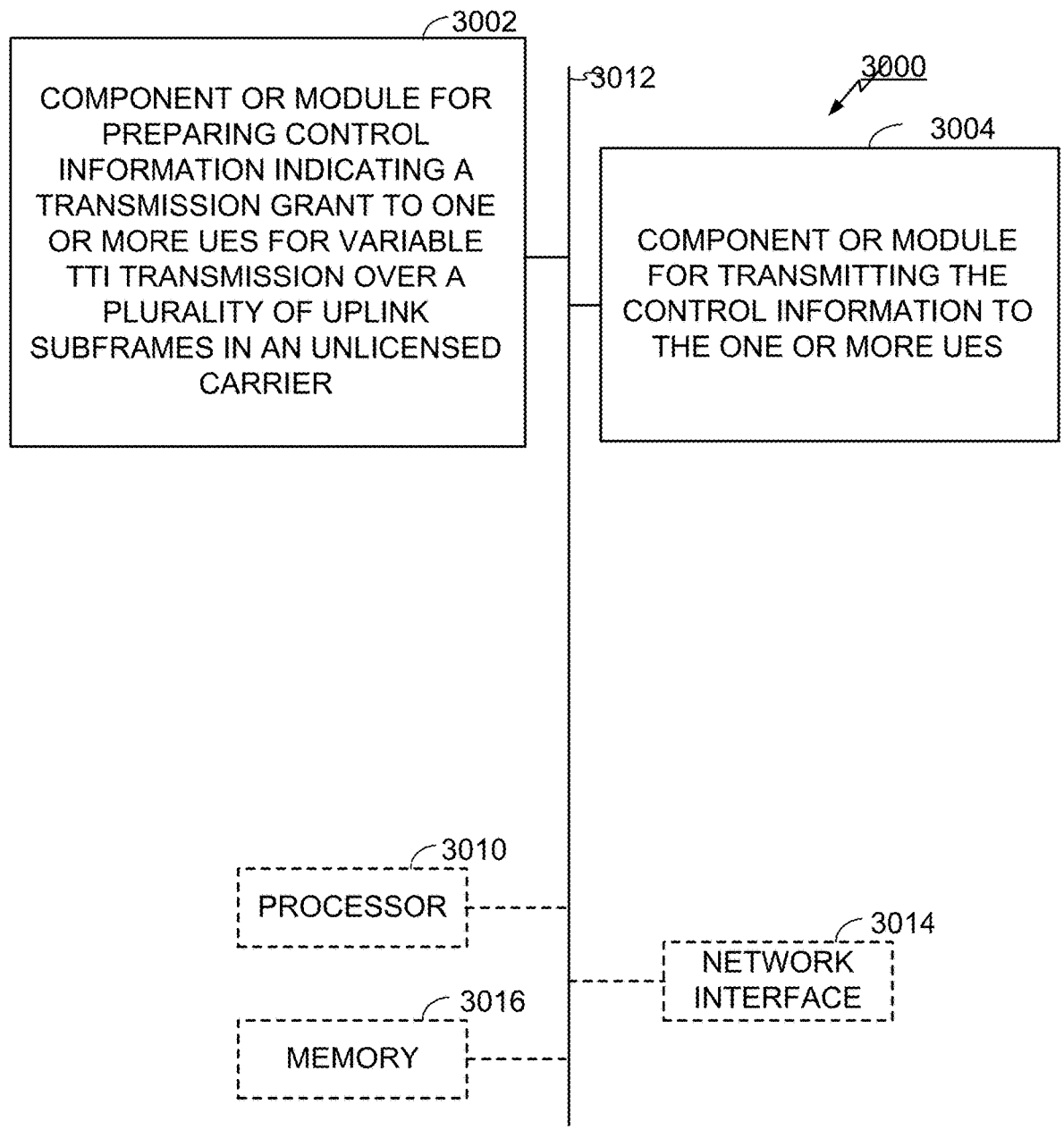
FIG. 30 illustrates an example apparatus for implementing a methodology according to FIG. 12A.

With reference to FIG. 30, there is provided an exemplary apparatus 3000 that may be configured as a base station, network entity, or other suitable entity, or as a processor, component or similar device for use within the base station, network entity, or other suitable entity, for network node selection. The apparatus 3000 may include functional blocks that can represent functions implemented by a processor, software, or combination thereof (e.g., firmware).

As illustrated, in one embodiment, the apparatus 3000 may include an electrical component or module 3002 for preparing control information indicating a transmission grant to one or more UEs for variable TTI transmission over a plurality of uplink subframes in an unlicensed carrier. The apparatus 3000 may include an electrical component or module 3004 for transmitting the control information to the one or more UEs.

In related aspects, the apparatus 3000 may optionally include a processor component 3010 having at least one processor, in the case of the apparatus 3000 configured as a network entity. The processor 3010, in such case, may be in operative communication with the components 3002-3004 or similar components via a bus 3012 or similar communication coupling. The processor 3010 may effect initiation and scheduling of the processes or functions performed by electrical components or modules 3002-3004.

In further related aspects, the apparatus 3000 may include a network interface component 3014 for communicating with other network entities. The apparatus 3000 may optionally include a component for storing information, such as, for example, a memory device/component 3016. The computer readable medium or the memory component 3016 may be operatively coupled to the other components of the apparatus 3000 via the bus 3012 or the like. The memory component 3016 may be adapted to store computer readable instructions and data for performing the activity of the components 3002-3004, and subcomponents thereof, or the processor 3010. The memory component 3016 may retain instructions for executing functions associated with the components 3002-3004. While shown as being external to the memory 3016, it is to be understood that the components 3002-3004 can exist within the memory 3016.

Figure 31:
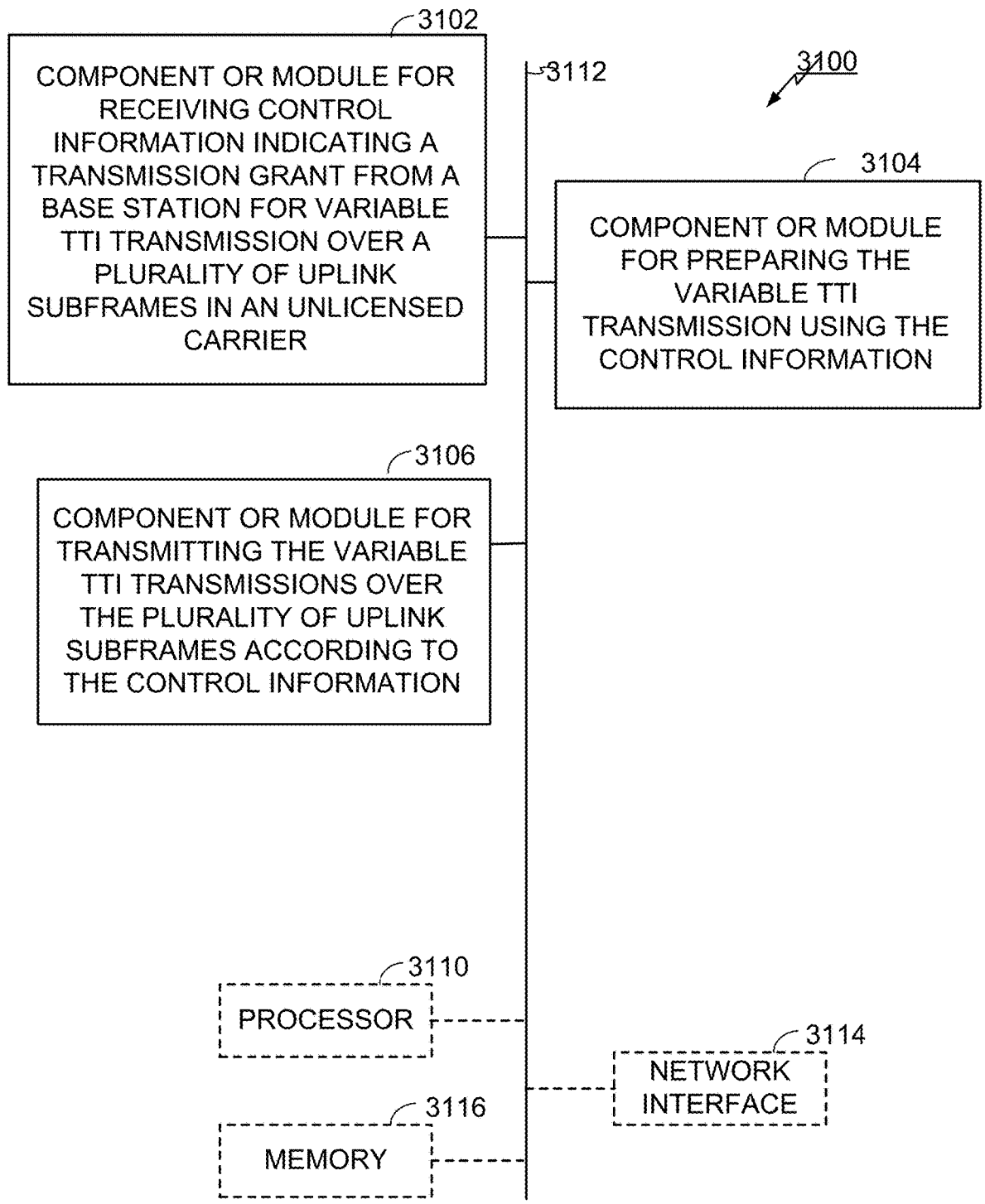
FIG. 31 illustrates an example apparatus for implementing a methodology according to FIG. 12B.

With reference to FIG. 31, there is provided an exemplary apparatus 3100 that may be configured as a UE, network entity, or other suitable entity, or as a processor, component or similar device for use within the UE, network entity, or other suitable entity, for network node selection. The apparatus 3100 may include functional blocks that can represent functions implemented by a processor, software, or combination thereof (e.g., firmware).

As illustrated, in one embodiment, the apparatus 3100 may include an electrical component or module 3102 for receiving control information indicating a transmission grant from a base station for variable TTI transmission over a plurality of uplink subframes in an unlicensed carrier. The apparatus 3100 may include an electrical component or module 3104 for preparing the variable TTI transmission using the control information. The apparatus 3100 may include an electrical component or module 3106 for transmitting the variable TTI transmissions over the plurality of uplink subframes according to the control information.

In related aspects, the apparatus 3100 may optionally include a processor component 3110 having at least one processor, in the case of the apparatus 3100 configured as a network entity. The processor 3110, in such case, may be in operative communication with the components 3102-3106 or similar components via a bus 3112 or similar communication coupling. The processor 3110 may effect initiation and scheduling of the processes or functions performed by electrical components or modules 3102-3106.

In further related aspects, the apparatus 3100 may include a network interface component 3114 for communicating with other network entities. The apparatus 3100 may optionally include a component for storing information, such as, for example, a memory device/component 3116. The computer readable medium or the memory component 3116 may be operatively coupled to the other components of the apparatus 3100 via the bus 3112 or the like. The memory component 3116 may be adapted to store computer readable instructions and data for performing the activity of the components 3102-3106, and subcomponents thereof, or the processor 3110. The memory component 3116 may retain instructions for executing functions associated with the components 3102-3106. While shown as being external to the memory 3116, it is to be understood that the components 3102-3106 can exist within the memory 3116.

Those of skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   selecting, by a base station, one or more downlink subframes for transmission of a joint control channel for variable transmission time interval (TTI) transmission over multiple uplink subframes in an unlicensed carrier;
   setting, by the base station, a size of the joint control channel;
   selecting, by the base station, an aggregation level for association with the joint control channel;
   transmitting, by the base station, the joint control channel over the one or more selected downlink subframes;
   generating, by the base station, an individual control channel with additional control information for a user equipment (UE); and
   transmitting, by the base station, the individual control channel to the UE, wherein the additional control information supersedes control information contained in the joint control channel.

2. The method of claim 1, wherein the selecting includes:
   selecting beginning on a first downlink subframe at least four subframes prior to a first scheduled uplink subframe associated with the variable TTI transmission.

3. The method of claim 1, wherein the one or more selected downlink subframes is one of: cell-specific or UE-specific.

4. The method of claim 3, wherein the joint control channel is cell-specific, the method further comprising:
   adding an uplink grant in the joint control channel associated with each UE located in a cell served by the base station.

5. The method of claim 3, wherein the joint control channel is UE-specific, the method further comprising:
   assigning one of the one or more selected downlink subframes to a specific UE for an uplink grant associated with the specific UE.

6. The method of claim 1, wherein the size is a fixed control size that assumes all available uplink subframes are scheduled for uplink transmission.

7. The method of claim 1, wherein the size includes two or more control sizes selected according to one or more available uplink subframes for the variable TTI transmission.

8. The method of claim 1, wherein the selecting the aggregation level includes:
   selecting the aggregation level from a plurality of aggregation levels as a function of available uplink subframes for the variable TTI transmission.

9. The method of claim 1, further comprising:
   selecting a resource set size for a downlink control channel as a function of available uplink subframes for the variable TTI transmission.

10. The method of claim 1, further comprising:
indicating, by the base station, in the joint control channel for a user equipment (UE) to transmit a same transport block over each of the multiple uplink subframes designated for the variable TTI transmission.

11. The method of claim 10, wherein the same transport block includes one or more of: uplink control signals and uplink data signals.

12. An apparatus configured for wireless communication, comprising:
means for selecting one or more downlink subframes for transmission of a joint control channel for variable transmission time interval (TTI) transmission over multiple uplink subframes in an unlicensed carrier;
means for setting, a size of the joint control channel;
means for selecting an aggregation level for association with the joint control channel;
means for transmitting the joint control channel over the one or more selected downlink subframes;
means for generating an individual control channel with additional control information for a user equipment (UE); and
means for transmitting the individual control channel to the UE, wherein the additional control information supersedes control information contained in the joint control channel.

13. The apparatus of claim 12, wherein the means for selecting includes:
means for selecting beginning on a first downlink subframe at least four subframes prior to a first scheduled uplink subframe associated with the variable TTI transmission.

14. The apparatus of claim 12,
wherein the joint control channel is cell-specific, and
wherein the apparatus further comprises:
means for adding an uplink grant in the joint control channel associated with each UE located in a cell.

15. The apparatus of claim 12, wherein the size is a fixed control size that assumes all available uplink subframes are scheduled for uplink transmission.

16. A computer program product for wireless communications in a wireless network, comprising:
a non-transitory computer-readable medium having program code recorded thereon, the program code including:
program code for causing a computer to select one or more downlink subframes for transmission of a joint control channel for variable transmission time interval (TTI) transmission over multiple uplink subframes in an unlicensed carrier;
program code for causing the computer to set a size of the joint control channel;
program code for causing the computer to select an aggregation level for association with the joint control channel;
program code for causing the computer to transmit the joint control channel over the one or more selected downlink subframes;
program code for causing the computer to generate an individual control channel with additional control information for a user equipment (UE); and
program code for causing the computer to transmit the individual control channel to the UE, wherein the additional control information supersedes control information contained in the joint control channel.

17. The computer program product of claim 16, wherein the program code for causing the computer to select includes:
program code for causing the computer to select beginning on a first downlink subframe at least four subframes prior to a first scheduled uplink subframe associated with the variable TTI transmission.

18. The computer program product of claim 16,
wherein the joint control channel is cell-specific, and
wherein the program code further includes:
program code for causing the computer to add an uplink grant in the joint control channel associated with each UE located in a cell.

19. The computer program product of claim 16, wherein the size is a fixed control size that assumes all available uplink subframes are scheduled for uplink transmission.

20. An apparatus configured for wireless communication, the apparatus comprising:
at least one processor; and
a memory coupled to the at least one processor,
wherein the at least one processor is configured:
to select one or more downlink subframes for transmission of a joint control channel for variable transmission time interval (TTI) transmission over multiple uplink subframes in an unlicensed carrier;
to set a size of the joint control channel;
to select an aggregation level for association with the joint control channel;
to transmit the joint control channel over the one or more selected downlink subframes;
to generate an individual control channel with additional control information for a user equipment (UE); and
to transmit the individual control channel to the UE, wherein the additional control information supersedes control information contained in the joint control channel.

21. The apparatus of claim 20, wherein, when selecting, the at least one processor is configured to:
select beginning on a first downlink subframe at least four subframes prior to a first scheduled uplink subframe associated with the variable TTI transmission.

22. The apparatus of claim 20,
wherein the joint control channel is cell-specific, and
wherein the at least one processor is further configured to:
add an uplink grant in the joint control channel associated with each UE located in a cell.

23. The apparatus of claim 20, wherein the size is a fixed control size that assumes all available uplink subframes are scheduled for uplink transmission.

24. A method of wireless communication, comprising:
receiving, by a user equipment (UE), from a base station, and over one or more downlink subframes, a joint control channel, for variable transmission time interval (TTI) transmission over multiple uplink subframes in an unlicensed carrier, with control information;
receiving, by the UE and from the base station, an individual control channel with additional control information;
determining, by the UE, whether the UE received the individual control channel without previously successfully receiving the joint control channel; and
performing, by the UE, an action when the UE received the individual control channel without previously successfully receiving the joint control channel.

25. The method of claim 24, wherein the one or more downlink subframes begin on a first downlink subframe at least four subframes prior to a first scheduled uplink subframe associated with the variable TTI transmission.

26. The method of claim 24, further comprising:
monitoring the joint control channel over the one or more downlink subframes for uplink grants identified for the UE.

27. The method of claim 24, further comprising:
monitoring one or more of the one or more downlink subframes identified for the UE for the joint control channel having uplink grants directed to the UE.

28. The method of claim 24, wherein a size of the joint control channel is a fixed control size that assumes all available uplink subframes are scheduled for uplink transmission.

29. The method of claim 28, wherein the size of the joint control channel includes one of two or more control sizes selected according to one or more available uplink subframes for the variable TTI transmission.

30. The method of claim 24, further comprising:
mapping control information from the joint control channel using an aggregation level received from the base station, wherein the aggregation level is one of a plurality of aggregation levels selected as a function of available uplink subframes for the variable TTI transmission.

31. The method of claim 24, further comprising:
receiving a resource set size indication for a downlink control channel, wherein the resource set size is a function of available uplink subframes for the variable TTI transmission.

32. The method of claim 24,
wherein the UE has previous control information contained within the joint control channel, and
wherein the additional control information supersedes the previous control information contained in the joint control channel.

33. The method of claim 24,
wherein the joint control channel is not successfully received by the UE, and
wherein performing the action comprises one of:
declaring an error event; or
beginning uplink transmission of an uplink signal when a successful clear channel access (CCA) is detected by the UE.

34. The method of claim 33, wherein the uplink signal is a channel use beacon signal (CUBS).

35. The method of claim 24, wherein the joint control channel is associated with an indication for the UE to transmit a same transport block over each of the multiple uplink subframes designated for the variable TTI transmission.

36. The method of claim 35, wherein the same transport block includes one or more of: uplink control signals and uplink data signals.

37. An apparatus configured for wireless communication, comprising:
means for receiving, from a base station and over one or more downlink subframes, a joint control channel, for variable transmission time interval (TTI) transmission over multiple uplink subframes in an unlicensed carrier, with control information;
means for receiving, from the base station, an individual control channel with additional control information;
means for determining whether the apparatus received the individual control channel without previously successfully receiving the joint control channel; and
means for performing an action when the apparatus received the individual control channel without previously successfully receiving the joint control channel.

38. The apparatus of claim 37, wherein the one or more downlink subframes begin on a first downlink subframe at least four subframes prior to a first scheduled uplink subframe associated with the variable TTI transmission.

39. The apparatus of claim 37, further comprising:
means for monitoring the joint control channel over the one or more downlink subframes for uplink grants identified for the apparatus.

40. The apparatus of claim 37, wherein a size of the joint control channel is a fixed control size that assumes all available uplink subframes are scheduled for uplink transmission.

41. A computer program product for wireless communications in a wireless network, comprising:
a non-transitory computer-readable medium having program code recorded thereon, the program code including:
program code for causing a user equipment (UE) to receive, from a base station and over one or more downlink subframes, a joint control channel, for variable transmission time interval (TTI) transmission over multiple uplink subframes in an unlicensed carrier, with control information;
program code for causing the UE to receive an individual control channel with additional control information;
program code for causing the UE to determine whether the UE received the individual control channel without previously successfully receiving the joint control channel; and
program code for causing the UE perform an action when the UE received the individual control channel without previously successfully receiving the joint control channel.

42. The computer program product of claim 41, wherein the one or more downlink subframes begin on a first downlink subframe at least four subframes prior to a first scheduled uplink subframe associated with the variable TTI transmission.

43. The computer program product of claim 41, wherein the program code further includes:
program code for monitoring the joint control channel over the one or more downlink subframes for uplink grants identified for the UE.

44. The computer program product of claim 41, wherein a size of the joint control channel is a fixed control size that assumes all available uplink subframes are scheduled for uplink transmission.

45. An apparatus configured for wireless communication, the apparatus comprising:
at least one processor; and
a memory coupled to the at least one processor,
wherein the at least one processor is configured:
to receive, from a base station and over one or more downlink subframes, a joint control channel, for variable transmission time interval (TTI) transmission over multiple uplink subframes in an unlicensed carrier, with control information;
to receive an individual control channel with additional control information;
to determine whether the apparatus received the individual control channel without previously successfully receiving the joint control channel; and to perform an action when the apparatus received the individual control channel without previously successfully receiving the joint control channel.

46. The apparatus of claim 45, wherein the one or more downlink subframes begin on a first downlink subframe at least four subframes prior to a first scheduled uplink subframe associated with the variable TTI transmission.

47. The apparatus of claim 45, wherein the at least one processor is further configured:
to monitor the joint control channel over the one or more downlink subframes for uplink grants identified for the apparatus.

48. The apparatus of claim 45, wherein a size of the joint control channel is a fixed control size that assumes all available uplink subframes are scheduled for uplink transmission.

* * * * *